US010956690B1

(12) United States Patent
Sutton et al.

(10) Patent No.: US 10,956,690 B1
(45) Date of Patent: Mar. 23, 2021

(54) SET-BASED OBJECT MANAGEMENT SYSTEM

(71) Applicant: INTERNATIONAL BUSINESS MACHINES CORPORATION, Armonk, NY (US)

(72) Inventors: Akil Khamisi Sutton, Poughkeepsie, NY (US); Edward C. McCain, Lagrangeville, NY (US); Yufei Wu, Poughkeepsie, NY (US); Kennedy Cheruiyot, Gardiner, NY (US); Ali Y. Duale, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/581,832

(22) Filed: Sep. 25, 2019

(51) Int. Cl.
*G06K 7/10* (2006.01)
*H04W 4/029* (2018.01)

(52) U.S. Cl.
CPC ........ *G06K 7/10366* (2013.01); *H04W 4/029* (2018.02)

(58) Field of Classification Search
CPC ........... G06K 7/10366; G06K 7/10099; G07C 2209/63; H04W 4/02; H04W 4/023; H04W 4/029; G08B 13/1427; G08B 21/182

(Continued)

(56) References Cited

U.S. PATENT DOCUMENTS 6,226,622 B1 5/2001 Dabbiere
6,631,271 B1 * 10/2003 Logan ................. G06F 3/002
455/456.1

(Continued)

FOREIGN PATENT DOCUMENTS

WO  WO 2004/109317 A2  12/2004

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Edwin C Holloway, III
(74) *Attorney, Agent, or Firm* — Tihon Poltavets, Esq.; Kevin P. Radigan, Esq.; Heslin Rothenberg Farley & Mesiti P.C.

(57) ABSTRACT

A management system monitors a set of objects of a user by wirelessly communicating with one or more location components associated with the objects, and each object of the set has a respective location component. The monitoring includes ascertaining by the management system, based at least in part on data obtained via wireless communication with the location component(s), a spatial centroid of the set and a spatial separation of an object in the set from the spatial centroid, and correlating the ascertained spatial centroid to a context classification of multiple context classifications. The management system further determines whether a difference between the ascertained spatial separation and the average spatial separation of the location component(s) for the correlated context classification exceeds an acceptable spatial separation tolerance. Based on the difference exceeding the acceptable tolerance, the management system provides an electronic alert to the user.

20 Claims, 16 Drawing Sheets

(58) Field of Classification Search
USPC ......... 340/10, 1, 10.32, 8.1, 539.13, 539.32, 340/568.1, 572.1, 10.1; 455/404.2, 456.1, 455/465.3
See application file for complete search history.

(56) References Cited

U.S. PATENT DOCUMENTS

| | | | |
|---|---|---|---|
| 8,373,562 B1 | 2/2013 | Heinze et al. | |
| 8,504,007 B2 | 8/2013 | Wesby | |
| 8,805,404 B1* | 8/2014 | Yang | H04W 4/023 |
| | | | 455/456.1 |
| 9,390,302 B2 | 7/2016 | Bassan-Eskenazi et al. | |
| 9,519,812 B2 | 12/2016 | Bassan-Eskenazi et al. | |
| 2006/0061476 A1* | 3/2006 | Patil | G01S 5/0284 |
| | | | 340/572.4 |
| 2006/0194587 A1 | 8/2006 | Sharony et al. | |
| 2007/0105566 A1 | 5/2007 | Sharony et al. | |
| 2008/0243815 A1* | 10/2008 | Chan | G06Q 30/0641 |
| 2010/0283600 A1 | 11/2010 | Herbert et al. | |
| 2010/0289646 A1* | 11/2010 | Raniere | G08B 13/14 |
| | | | 340/572.1 |
| 2014/0089243 A1* | 3/2014 | Oppenheimer | G06F 21/88 |
| | | | 706/46 |
| 2014/0104063 A1 | 4/2014 | Troxler | |
| 2014/0266698 A1 | 9/2014 | Hall et al. | |
| 2015/0088792 A1* | 3/2015 | O'Neill | G06N 20/00 |
| | | | 706/12 |
| 2015/0163766 A1* | 6/2015 | Weiss | G01S 5/14 |
| | | | 455/456.1 |
| 2016/0300049 A1* | 10/2016 | Guedalia | G06K 9/6272 |
| 2017/0142549 A1 | 5/2017 | Herbert et al. | |
| 2018/0182230 A1 | 6/2018 | Kumar et al. | |
| 2018/0219759 A1* | 8/2018 | Brown | H04L 67/18 |
| 2018/0227709 A1 | 8/2018 | Evans et al. | |
| 2018/0242102 A1 | 8/2018 | Leveque et al. | |
| 2019/0035245 A1 | 1/2019 | Oppenheimer | |
| 2019/0279495 A1* | 9/2019 | Nishioka | G08B 25/10 |

OTHER PUBLICATIONS

"IoT Edge Devices", https://www.apptricity.com/iot-devices/?iottab-rtls, downloaded Sep. 10, 2019 (13 pages).

Chipolo, https://chipolo.net/en/pages/products, downloaded Sep. 10, 2019 (2 pages).

DUET by PROTAG, http://theprotag.com/product/duet/, downloaded Sep. 10, 2019 (2 pages).

Kaltiot, "Smart Tracker", https://kaltiot.com/, downloaded Sep. 10, 2019 (12 pages).

Linquet, https://linquet.com/, downloaded Sep. 10, 2019 (2 pages).

Pixie, "What is Pixie?", http://supportgetpixie.com/hc/en-us/articles/, downloaded Sep. 10, 2019 (6 pages).

Sierra Wireless, https://www.sierrawireless.com/resources/infographics/asset-tracking/, downloaded Sep. 10, 2019 (1 page).

Stick-N-Find, https://www.fundable.com/sticknfind, downloaded Sep. 10, 2019 (3 pages).

Tile, https://www.thetileapp.com/, downloaded Sep. 10, 2019 (19 pages).

TrackR, https://secure.thetrackr.com/, downloaded Sep. 10, 2019 (6 pages).

* cited by examiner

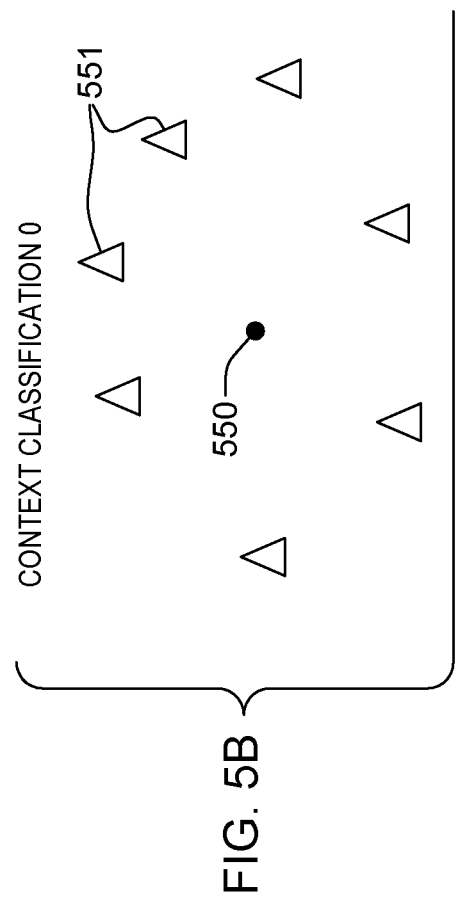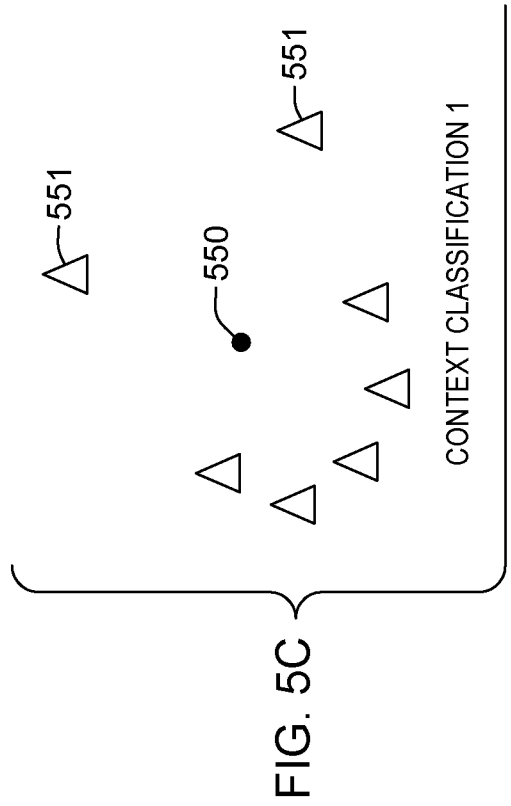

MONITORING, BY A MANAGEMENT SYSTEM, A SET OF OBJECTS OF A USER, THE MONITORING INCLUDING THE MANAGEMENT SYSTEM WIRELESSLY COMMUNICATING WITH ONE OR MORE LOCATION COMPONENTS ASSOCIATED WITH THE OBJECTS, EACH OBJECT OF THE SET OF OBJECTS HAVING A RESPECTIVE LOCATION COMPONENT ASSOCIATED THEREWITH, THE MONITORING INCLUDING: ~900

ASCERTAINING, BY THE MANAGEMENT SYSTEM, BASED AT LEAST IN PART ON DATA OBTAINED VIA WIRELESS COMMUNICATION WITH THE ONE OR MORE LOCATION COMPONENTS, A SPATIAL CENTROID OF THE SET OF OBJECTS AND A SPATIAL SEPARATION OF AN OBJECT IN THE SET FROM THE SPATIAL CENTROID; ~902

CORRELATING, BY THE MANAGEMENT SYSTEM, THE ASCERTAINED SPATIAL CENTROID TO A CONTEXT CLASSIFICATION OF MULTIPLE CONTEXT CLASSIFICATIONS; ~904

DETERMINING, BY THE MANAGEMENT SYSTEM, WHETHER A DIFFERENCE BETWEEN THE ASCERTAINED SPATIAL SEPARATION OF THE OBJECT AND AN AVERAGE SPATIAL SEPARATION OF THE OBJECT FOR THE CORRELATED CONTEXT CLASSIFICATION EXCEEDS AN ACCEPTABLE SPATIAL SEPARATION TOLERANCE FOR THE CORRELATED CONTEXT CLASSIFICATION; AND ~906

BASED ON THE DIFFERENCE EXCEEDING THE ACCEPTABLE SPATIAL SEPARATION TOLERANCE, PROVIDING, BY THE MANAGEMENT SYSTEM, AN ELECTRONIC ALERT TO THE USER ~910

WHERE DURING THE MONITORING AT LEAST TWO CONTEXT CLASSIFICATIONS OF THE MULTIPLE CONTEXT CLASSIFICATIONS HAVE DIFFERENT AVERAGE SPATIAL SEPARATIONS OF THE OBJECT FROM RESPECTIVE SPATIAL CENTROIDS OF THE AT LEAST TWO CONTEXT CLASSIFICATIONS, AND DIFFERENT ACCEPTABLE SPATIAL SEPARATION TOLERANCES ~912

FIRTHER INCLUDING DETERMINING, BY THE MANAGEMENT SYSTEM, THE MULTIPLE CONTEXT CLASSIFICATIONS, THE DETERMINING INCLUDING: ~914

ASCERTAINING OVER A CALIBRATION TIME PERIOD, BASED AT LEAST IN SYSTEM AND THE ONE OR MORE LOCATION COMPONENTS ASSOCIATED WITH THE OBJECTS, CALIBRATION SETS OF SPATIAL CENTROIDS OF THE OBJECTS IN DIFFERENT USER CONTEXTS; AND ~916

SORTING THE CALIBRATION SETS OF SPATIAL CENTROIDS INTO THE MULTIPLE CONTEXT CLASSIFICATIONS, EACH CONTEXT CLASSIFICATION BEING ASSOCIATED WITH A RESPECTIVE CONTEXT OF THE DIFFERENT USER CONTEXTS ~918

FIG. 9A

FURTHER INCLUDING ASCERTAINING RESPECTIVE AVERAGE SPATIAL SEPARATIONS OF OBJECTS IN THE SET RELATIVE TO A DETERMINED SPATIAL CENTROID OF EACH CONTEXT CLASSIFICATION; AND ~920

ASCERTAINING FOR THE DETERMINED CONTEXT CLASSIFICATIONS A RESPECTIVE ACCEPTABLE SPATIAL SEPARATION TOLERANCE FOR THE OBJECT FOR EACH CONTEXT CLASSIFICATION ~922

WHERE DURING THE MONITORING THE RESPECTIVE ACCEPTABLE SPATIAL SEPARATION TOLERANCE FOR THE OBJECT IS DIFFERENT BETWEEN AT LEAST TWO DETERMINED CONTEXT CLASSIFICATIONS OF THE MULTIPLE DETERMINED CONTEXT CLASSIFICATIONS ~924

FURTHER INCLUDING MODIFYING BY THE USER THE SET OF OBJECTS BEING MONITORED BY THE MANAGEMENT SYSTEM, AND BASED ON THE MODIFYING, RE-DETERMINING, BY THE MANAGEMENT SYSTEM, THE MULTIPLE CONTEXT CLASSIFICATIONS, INCLUDING ASCERTAINING RESPECTIVE AVERAGE SPATIAL SEPARATIONS OF OBJECTS IN THE MODIFIED SET RELATIVE TO A DETERMINED SPATIAL CENTROID OF EACH CONTEXT CLASSIFICATION ~926

FURTHER INCLUDING IDENTIFYING USE OF THE SET OF OBJECTS OF THE USER IN A NEW USER CONTEXT, AND BASED THEREON, THE METHOD FURTHER INCLUDES RE-DETERMINING, BY THE MANAGEMENT SYSTEM, THE MULTIPLE CONTEXT CLASSIFICATIONS, WHEREIN THE RE-DETERMINED MULTIPLE CONTEXT CLASSIFICATIONS INCLUDE, IN PART, A NEW CONTEXT CLASSIFICATION ASSOCIATED WITH THE NEW USER CONTEXT ~928

WHERE THE MONITORING FURTHER INCLUDES ESTABLISHING, BY THE MANAGEMENT SYSTEM, A MONITOR NETWORK INCLUDING THE LOCATION COMPONENTS ASSOCIATED WITH THE SET OF OBJECTS, THE MONITOR NETWORK BEING ONE MONITOR NETWORK OF MULTIPLE MONITOR NETWORKS, EACH MONITOR NETWORK INCLUDING LOCATION COMPONENTS ASSOCIATED WITH, AT LEAST IN PART, A DIFFERENT SET OF OBJECTS, AND THE METHOD FURTHER INCLUDES: ~930

INSTANTIATING A DIGITAL TWIN MONITOR COMPONENT WITHIN THE MONITOR NETWORK BASED ON THE USER LOANING AN OBJECT OF THE SET OF OBJECTS TO ANOTHER USER WITH ANOTHER MONITOR NETWORK OF THE MULTIPLE MONITOR NETWORKS ~932

FIG. 9B

FURTHER INCLUDING ESTABLISHING, BY THE MANAGEMENT SYSTEM, A LOANED OBJECT STATUS LINK TO THE ANOTHER MONITOR NETWORK OF THE ANOTHER USER TO PROVIDE THE USER WITH A STATUS UPDATE ON WHETHER THE LOANED OBJECT REMAINS WITHIN THE ANOTHER MONITOR NETWORK, ABSENT IDENTIFYING TO THE USER A GEOGRAPHIC LOCATION OF THE LOANED OBJECT ~934

WHERE AT LEAST TWO OBJECTS OF THE SET OF OBJECTS OF THE USER HAVE DIFFERENT TYPES OF LOCATION COMPONENTS ASSOCIATED THEREWITH, THE DIFFERENT TYPES OF LOCATION COMPONENTS INCLUDING AN ELECTRONIC SENSOR AND AN ELECTRONIC TAG, THE ELECTRONIC SENSOR BEING ASSOCIATED WITH A FIRST OBJECT OF THE SET OF OBJECTS, AND THE ELECTRONIC TAG BEING ASSOCIATED WITH A SECOND OBJECT OF THE SET OF OBJECTS, WITH THE ELECTRONIC SENSOR, IN PART, WIRELESSLY OBTAINING LOCATION DATA FOR THE SECOND OBJECT FROM THE ELECTRONIC TAG, AND THE MANAGEMENT SYSTEM OBTAINS THE LOCATION DATA FOR THE SECOND OBJECT AND LOCATION DATA FOR THE FIRST OBJECT FROM THE ELECTRONIC SENSOR ~936

WHERE A MOBILE DEVICE OF THE USER INCLUDES, AT LEAST IN PART, THE MANAGEMENT SYSTEM, AND THE ELECTRONIC SENSOR WIRELESSLY COMMUNICATES WITH THE ELECTRONIC TAG USING A FIRST WIRELESS COMMUNICATION STANDARD, AND THE MOBILE DEVICE COMMUNICATES WITH THE ELECTRONIC SENSOR USING A SECOND WIRELESS COMMUNICATION STANDARD, THE FIRST AND SECOND WIRELESS COMMUNICATION STANDARDS BEING DIFFERENT WIRELESS COMMUNICATION STANDARDS, AND THE SECOND WIRELESS COMMUNICATION STANDARD HAVING A GREATER WIRELESS COMMUNICATION RANGE THAN THE FIRST WIRELESS COMMUNICATION STANDARD ~938

WHERE THE ACCEPTABLE SPATIAL SEPARATION TOLERANCE FOR THE CORRELATED CONTEXT CLASSIFICATION IS PREDICTIVELY DETERMINED BY A COGNITIVE AGENT OF THE MANAGEMENT SYSTEM ~940

FIG. 9C

SET-BASED OBJECT MANAGEMENT SYSTEM

BACKGROUND

The commercial market for monitoring personal objects has increased significantly over the last decade, supported by advancements in wireless communications, wireless networking, cloud-based storage, and mobile applications. A number of commercial providers in this market offer a range of products and services to assist a user in monitoring and tracking objects. Available solutions are often deployed using a network of after-market electronic tags attached to the objects. Typically, once a user realizes that an object has been lost, then the user invokes a mobile application which attempts to contact the electronic tag attached to that object in an effort to locate the object.

SUMMARY

Certain shortcomings of the prior art are overcome and additional advantages are provided through the provision, in one or more aspects, of a method of managing objects. The method includes monitoring, by a management system, a set of objects of a user. The management system wirelessly communicates with one or more location components associated with the objects, where each object in the set of objects has a respective location component associated therewith. The monitoring includes ascertaining, by the management system, based at least in part on data obtained via wireless communication with the one or more location components, a spatial centroid of the set, and a spatial separation of an object in the set from the spatial centroid. The monitoring includes correlating, by the management system, the ascertained spatial centroid to a context classification of multiple context classifications, and determining, by the management system, whether a difference between the ascertained spatial separation of the object and an average spatial separation of the object for the correlated context classification exceeds an acceptable spatial separation tolerance for the correlated context classification. Based on the difference exceeding the acceptable spatial separation tolerance, the management system provides an electronic alert to the user.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5B-5D depict examples of different context classifications of a set of objects of a user, in accordance with one or more aspects of the present invention;

FIG. 9A-9C depict one embodiment of set-based object management system processing, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of a set-based object management system and/or method such as described herein.

Figure 10:
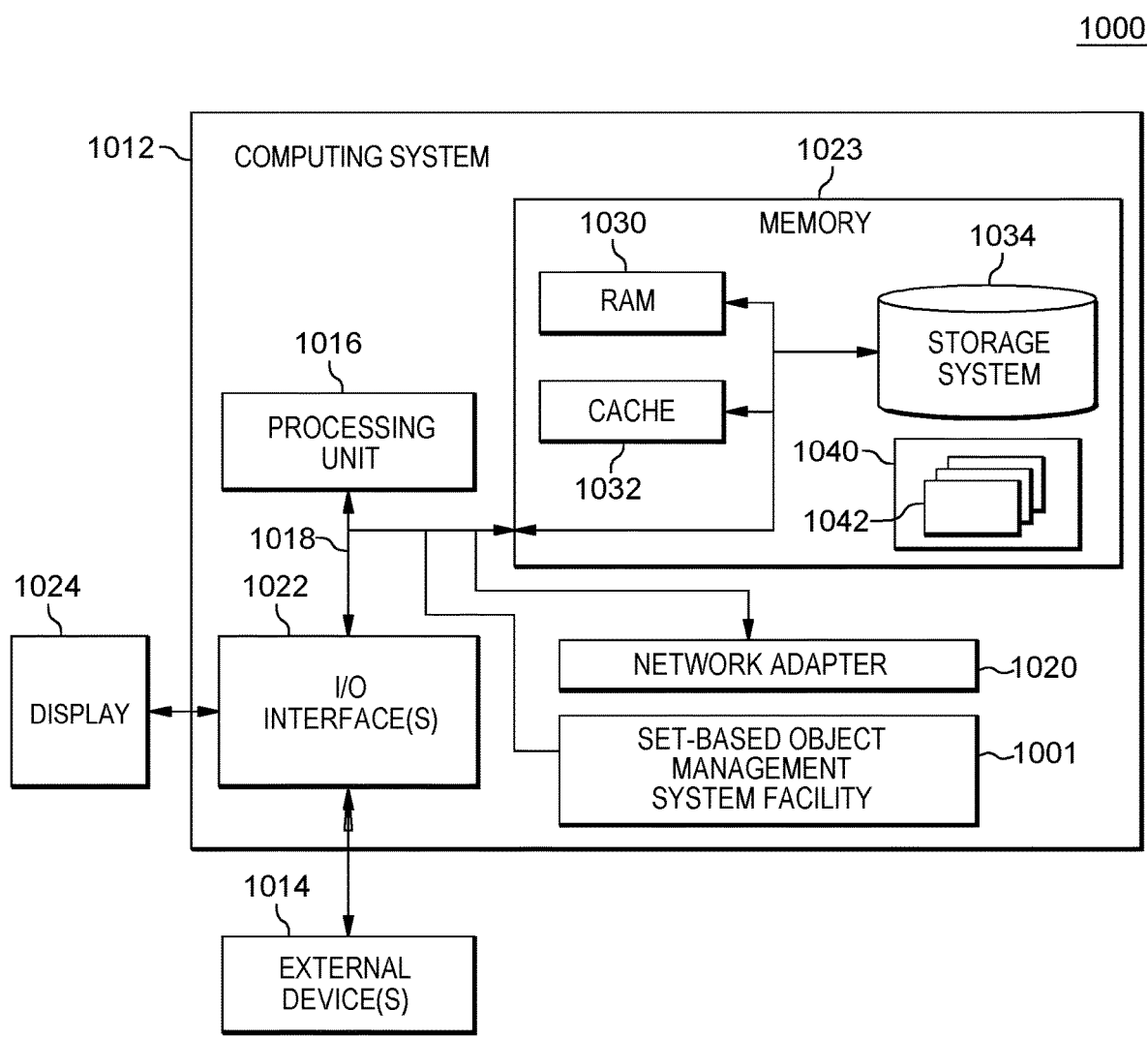
FIG. 10 depicts one embodiment of a computing system which can implement or facilitate implementing set-based object management system processing, in accordance with one or more aspects of the present invention.

As understood by one skilled in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 10 as program/utility 1040, having a set (at least one) of program modules 1042, which can be stored in memory 1023. As a further example, in FIG. 2 program code implementing one or more aspects described herein could be stored or resident within main memory 208, read-only memory 224, disk storage 226, CD-ROM 230, and/or in one or more other peripheral devices of a computing environment 200.

There are a wide variety of location components, such as electronic sensors and electronic tags, commercially available today. These include electronic article surveillance tags, radio frequency identification devices, smart cards, intelligent tags, Internet of Thing devices, etc. These electronic devices, referred to herein generally as wireless location components or location components, can, in one or more aspects, signal their presence and transmit data using one or more of a variety of known wireless communication standards or protocols. Although location components can be very different products, they are generally compact electronic devices, sensors, tags, etc., that have application in a management system and environment such as disclosed herein.

The commercial market for monitoring or tracking objects, such as personal items, has increased significantly, supported in part, by advancements in electronic sensors and tags, as well as in wireless communications, wireless networking, cloud-based storage, and mobile applications. Many object tracking solutions available today focus on the personal device tracking market, and can employ for instance an after-market tag attached via adhesive to the object of interest. Such solutions allow multiple devices to be tracked, but these solutions not autonomous in the sense of providing spatially-relevant, real-time preemptive alerts when an object is about to be misplaced or lost. For instance, using available approaches, a user must first realize that an object has been lost, and once the user realizes that the object has been lost, then the user might invoke a mobile application which contacts the associated location component or tag in an effort to track the misplaced object. Alternatively, a present-day system could alert the user at the point of losing communication with an object. In this scenario, a predefined threshold separation distance is used as a trigger. A drawback to this approach is that it is not predictive. Further, because the location components are typically all attached after-market, they can be susceptible to compromise by harsh chemicals, abrasion or mechanical damage.

Advantageously, disclosed herein are object management systems and methods which facilitate real-time autonomous tracking of objects through the utilization of embedded (or attached) wireless location components, such as radio frequency identification devices (RFIDs) or other electronic sensors or tags. In one or more implementations, the wireless location components are linked together in a decentralized and autonomous fashion to provide real-time, spatially-relevant and predictive monitoring of a set of objects, such as a set including a user's wallet, keys, phone, backpack, jewelry, etc. In this manner, real-time and autonomous alerts can be provided to highlight to a user when an object is about to be lost or misplaced. Further, in one or more implementations, predictive analytics is employed to provide preemptive reminders for particular objects that are about to be misplaced or lost. In one or more embodiments, the wireless location components used to track the user's objects can be embedded within the objects, and therefore not be susceptible to tamper or damage. Additionally, the autonomous approaches described herein can be based on constant feedback on the separation of a given object relative to a set or cluster of objects in a user's monitor network of objects. Further, the object management system and method disclosed herein provide a secure and private process for loaning an object in a user's monitor network, to another user having a different monitor network.

Embodiments of the present invention include a computer-implemented method, computer program product, and a computing system, where program code executing on one or more processors provides a management facility which implements set-based object management such as described herein. Generally stated, a method of managing objects is disclosed which includes monitoring, by a management system, a set of objects of a user. The monitoring includes the management system wirelessly communicating with one or more location components associated with the objects. Each object of the set of objects has a respective location component associated therewith. The monitoring includes: ascertaining, by the management system, based at least in part on data obtained via wireless communication with the one or more location components, a spatial centroid of a set of objects and a spatial separation of an object in the set from the spatial centroid; correlating, by the management system, the ascertained spatial centroid to a temporally-correlated context classification of multiple context classifications; and determining, by the management system, whether a difference between the ascertained spatial separation of the object and an average spatial separation of the object for the correlated context classification exceeds an acceptable spatial separation tolerance for the correlated context classification. Based on the difference exceeding the acceptable spatial separation tolerance, the management system provides an electronic alert to the user. In this manner, the user is provided with a real-time and autonomous alert highlighting to the user that an object is about to be lost or misplaced, without the user realizing that the object has been lost or misplaced.

In one or more embodiments, at least two context classifications of the multiple context classifications have different average spatial separations of the object from the spatial centroids of the at least two context classifications and different acceptable spatial separation tolerances. For instance, the average spatial separation of an object being monitored may be different depending on the user's context. Note that the context used herein refers to, for instance, a sub-collection of objects, a location, an activity, a time of day, or any combination thereof, etc., as established during a calibration mode of the management system.

In one or more implementations, the method further includes determining, by the management system, the multiple context classifications. The determining includes ascertaining over a calibration time period, based at least in part on wireless communications between the management system and the one or more s associated with the objects, calibration sets of spatial centroids of the objects in different user contexts, and sorting the calibration sets of spatial centroids into multiple context classifications, each context classification being associated with a respective context of the different user contexts.

In one or more embodiments, the determining further includes ascertaining respective average spatial separations of objects in the set relative to a determined spatial centroid of each context classification, and ascertaining for the determined context classifications a respective acceptable spatial separation tolerance for the object for each context classification. In one embodiment, the respective acceptable spatial separation tolerance for the object is different between at least two determined context classifications of the multiple determined context classifications.

In one or more embodiments, the method further includes modifying, by the user, the set of objects being monitored by the management system, and based on the modifying, re-determining, by the management system, the multiple context classifications, including ascertaining respective average spatial separations of objects in the modified set relative to a determined spatial centroid of each context classification.

In one or more embodiments, the method further includes identifying use of a set of objects of the user in a new user context, and based thereon, the method further includes re-determining, by the management system, the multiple context classifications, where the re-determined multiple context classifications include, in part, a new context classification associated with the new user context.

In one or more implementations, the monitoring includes establishing, by the management system, a monitor network including the location components associated with the set of objects, the monitor network being one monitor network of multiple monitor networks, each monitor network including location components associated with, at least in part, a different set of objects, and the method further includes instantiating a digital twin location component within the monitor network based on the user loaning an object of the set of objects to another user with another monitor network of the multiple monitor networks. In one or more embodiments, the method further includes establishing, by the management system, a loaned object status link to the another monitor network of the another user to provide one or more status updates confirming that the loaned object remains within the another monitor network, absent identifying to the user a geographic location of the loaned object.

In one or more implementations, at least two objects of the set of objects of the user have different types of location components associated therewith. The different types of location components include an electronic sensor and an electronic tag. The electronic sensor is associated with a first object of the set of objects, and the electronic tag is associated with a second object of the set of objects. The electronic sensor, in part, wirelessly obtains location data for the second object from the electronic tag, and the management system obtains location data for the second object and the location data for the first object from the electronic sensor. In one embodiment, a mobile device of the user includes, at least in part, the management system, and the electronic sensor wirelessly communicates with the electronic tag using a first wireless communication standard, and the mobile device communicates with the electronic sensor using a second wireless communication standard, the first and second wireless communication standards being different wireless communication standards. For instance, in one embodiment, the second wireless communication standard has a greater wireless communication range than the first wireless communication standard.

In one or more implementations, a method, system, and computer program product are provided herein for managing multiple objects utilizing spatial monitoring of location components embedded in clustered objects. The method includes identifying two or more location components associated with two or more objects, where each of the two or more location components is associated a respective object. The two or more location components are calibrated, where the calibrating includes determining an initial spatial centroid for the two or more location components, and determining an initial spatial separation between each of the components. In a monitoring mode, the two or more components are monitored, where the monitoring includes determining a current spatial centroid for the two or more location components, and determining a current spatial separation of each object. Responsive to determining that the current spatial separation exceeds a threshold, then a lost object is identified from the two or more objects with the exceeded threshold. The user is alerted of the lost or soon-to-be-displaced object. Further, the two or more location components can accommodate a request to locate a virtual copy of at least one object of a user at the spatial centroid when that object is to be borrowed by another user.

Note that, in one or more embodiments, the current spatial centroid in monitoring mode is not compared to a threshold but is used, in concert with the time of day and the set of objects being tracked, to establish a contextual classification. This contextual classification in turn can dynamically set the threshold for the unique spatial separation of each object in the set, as explained herein.

Advantageously, the object management system and method disclosed herein cognitively learns the behaviors of the user, including frequently visited locations, activities, traveling behaviors, etc., and correlates these contexts to personal objects of the user's private network of objects being monitored. As noted, each object being monitored has at least one location component associated therewith to allow for the intelligent tracking of the object as part of a set or collection of objects. Further, the object management system is contextual in that the system applies, for instance, location-based rules for setting of acceptance criterion for object separation, and for an electronic alert that an object is about to be lost or misplaced. Further, the object management system can electronically communicate with a user's electronic scheduling calendar to know, for instance, whether the user is traveling for business or on vacation, or is at an appointment, at work, at home, etc. Further, the object management system disclosed herein is advantageously proactive and predictive. For instance, through the learning or calibration mode, the management system cognitively evolves to provide predictive or proactive alerts when a user demonstrates a high probability of forgetting an object in the user's monitor network. In this manner, the management system can provide earlier alerts; still be, for instance, within the communication range of the location component associated with the object. Still further, the object management system disclosed herein can leverage "digital twin" technology to facilitate the sharing of objects among multiple monitor networks, while simultaneously protecting privacy of the borrower. With digital twin technology, a virtual replica of an object remains within the lender's monitor network.

In one or more embodiments, once a loan request has been authenticated and executed, then a digital twin is virtually instantiated at the same location as the spatial centroid of the real items under the control of the lender. There are several advantages to this approach. For instance, such an approach simplifies the lending process as multiple loan requests to different borrowers will all result in digital twin virtual copies of the loaned items being co-located at the spatial centroid of the remaining real items. In this way, the lender need not be concerned with spatial separation of the loaned item(s) in the borrower(s) network. The only concern of the lender is whether or not the loaned items(s) continues to be under the control of the borrower(s). Further, such an approach allows the spatial centroid in the lender's network to remain truly representative of the real items under the lenders control. Any consideration for the spatial location of the virtually instantiated digital twin could impede the native cognitive based monitoring of the real items under the lender's control. Also, as alluded to, since the digital twin is virtually instantiated at the spatial centroid, then it natively moves with the lender and lender's network.

Figure 1:
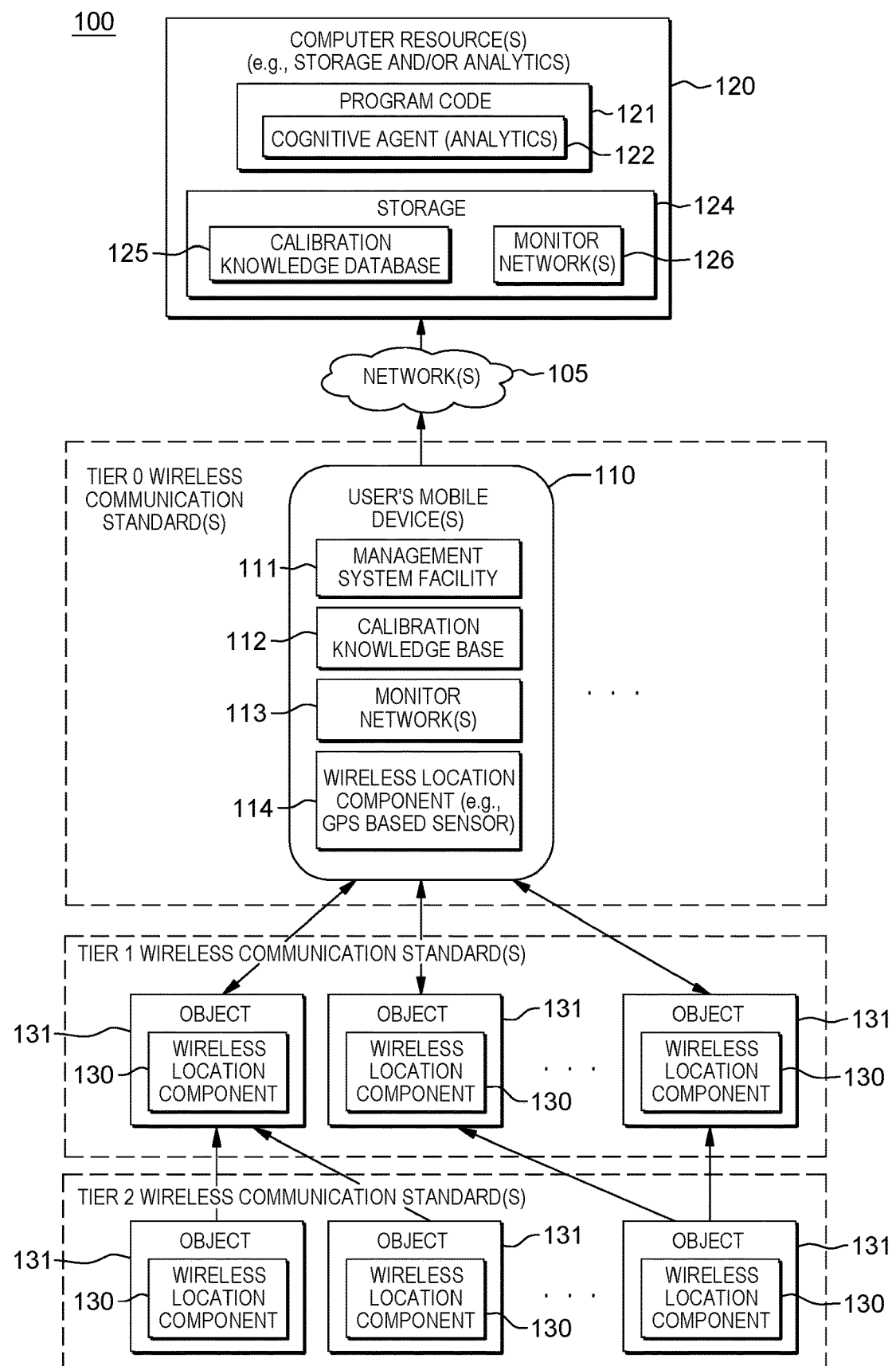
FIG. 1 is an illustration of one embodiment of a set-based object management system, in accordance with one or more aspects of the present invention.

By way of example, FIG. 1 depicts one embodiment of a system 100 into which various aspects of some embodiments of the present invention can be implemented or integrated. System 100 includes computing devices, including one or more mobile devices 110 owned by or associated with a user. By way of example, in one or more embodiments, the user's mobile device 110 has a wireless communication capability, and can be, for instance, a mobile phone, a personal digital assistant (PDA), a wireless computer, a laptop computer, a tablet, etc. The wireless communication capability or system can, for instance, be one or more of a code division multiple access (CDMA) system, a global system for mobile communication (GSM), a wide-band CDMA (W-CDMA) system, a long-term evolution (LTE) system, a LTE advanced system, a WiFi-based system, a cellular-based system, a Bluetooth®-based system, a Zig-Bee™-based system, a radio frequency identification (RFID)-based system, a near field communication (NFC)-based system, etc.

The mobile device(s) 110 is capable of providing bi-directional communication via a receive path and a transmit path. On the receive path, signals transmitted by, for instance, one or more wireless location components (e.g., electronic devices, sensors, tags, etc.) are received by an antenna, and provided to a receiver. The receiver conditions and digitizes the received signals, and provides the conditioned and digitized signals to a digital section of the mobile device for further processing. On a transmit path, a transmitter receives data to be transmitted from the digital section, processes and conditions the data, and generates a modulated signal, which can be transmitted via the antenna to one or more wireless location components, and/or to one or more other mobile devices 110 or one or more computer resources 120. The receiver and the transmitter can be part of a transceiver, and support, for instance, one or more of the above-noted wireless communication standards, protocols or techniques.

The digital section of the mobile device can include various processing, interfaces, and memory units, such as, for example, a modem processor, a reduced instruction set computer/digital signal processor (RISC/DSP), a controller/processor, an internal memory, a graphic/display processor, and/or an external bus interface (EBI). The modem processor can perform processing for data transmission and reception, for example, encoding, modulation, demodulation, and decoding. The RISC/DSP can perform general and specialized processing for the wireless device. The controller/processor can control the operation of the various processing and interface units within the digital section. The internal memory stores data and/or instructions for various units within the digital section.

In general, a mobile device such as referenced herein, is indicative of various types of devices, such as a wireless smartphone, cellular phone, laptop computer, tablet, wireless communication personal computer (PC), a PDA, etc. Any such mobile device can have memory for storing instructions and data, as well as hardware, software, and/or firmware, and combinations thereof, configured or programmed to perform processes such as disclosed herein.

As shown, the one or more mobile devices 110 can include program code, such as a mobile application code, which implements one or more aspects of a management system facility 111, such as described herein, as well as a calibration knowledge base 112, which can include multiple context classifications for the user's private monitor network(s) 113 of objects being monitored. Further, the user's mobile device 110 can include a respective wireless location component 114, with, for instance, Global Positioning System (GPS)-based capabilities, to ascertain a geographic location of the user's mobile device at, for instance, calibration time intervals and/or monitor time intervals, such as discussed herein. Further, the wireless location component 114 can incorporate a sensor to obtain spatial location data from other wireless location components 130 associated with the user's set of objects 131 being monitored. As noted, in one or more embodiments, one or more aspects of management system facility 111, calibration knowledge base 112 and/or monitor network(s) 113 can reside remotely, for instance, on one or more computer resources 120.

Mobile device(s) 110 can operatively couple with one or more computer resources 120 across one or more networks 105. In addition to coupling mobile device(s) 110 and computer resource(s) 120, one or more networks 105 can couple mobile device(s) 110 with wireless location components 130 associated with the respective objects 131 of the set of objects of the user to be monitored. By way of example, network(s) 105 can be or include a telecommunications network, a local area network (LAN) a wide area network (WAN), such as the Internet, or a combination thereof, and can include wired, wireless, fiber optic connections, etc. The network(s) 105 can include one or more wired and/or wireless networks that are capable of receiving and transmitting data, such as data associated with monitoring a user's objects, as described herein.

The one or more computer resources 120 can provide storage 124 and/or analytics for one or more aspects of a management system, such as described herein. As illustrated, in one embodiment, storage 124 of remote computer resource(s) 120 can include a calibration knowledge base 125, and one or more private monitor networks 126, each representing a set of location-component-enabled objects being monitored for a user, in accordance with the processes disclosed herein. In one or more embodiments, the mobile device(s) 110 and/or computer resource(s) 120 execute program code to implement aspects of management system processing disclosed herein. By way of example only, computer resource(s) 120 can include program code 121 implementing, in part, a cognitive agent 122 to assist with one or more aspects disclosed herein. Alternatively, one or more aspects of the program code 121 and/or cognitive agent 122 can be implemented on mobile device(s) 110.

In some embodiments of the present invention, the program code executing on computer resource(s) 120 and/or user mobile device(s) 110 can utilize existing cognitive analysis tools or agents, to determine, for instance, spatial centroid context classifications during a calibration mode of object management system processing, such as disclosed herein.

More particularly, embodiments of the present invention can utilize a variety of existing cognitive agents, as well as existing APIs to, for instance, group spatial centroids into context classifications during a calibration mode of the object management system, and/or provide predictive alerts when an object within a user monitor network of objects is about to be lost or misplaced. By way of example, some embodiments of the present invention can utilize IBM Watson® as the cognitive agent. IBM Watson® is a product of International Business Machines Corporation, and is a registered trademark of International Business Machines Corporation, Armonk, N.Y., USA. Note that this is a non-limiting example of a cognitive agent that can be utilized in embodiments of the present invention, and is discussed for illustrative purposes only, and not to imply, implicitly or explicitly, any limitations regarding cognitive agents that can implement aspects of embodiments of the present invention.

In some embodiments of the present invention that utilize IBM Watson® as a cognitive agent, the program code can interface with IBM Watson® APIs to perform a cognitive analysis of, for instance, spatial centroids to group the centroids into context classifications during a calibration mode, such as discussed herein, and/or to provide a predictive alert when an object of a user's monitor network of objects is about to be lost or misplaced, as well as one or more other aspects of the processing disclosed herein. In some embodiments of the present invention, the program code interfaces with the Application Program Interfaces (APIs) that are part of a known cognitive agent, such as IBM Watson® application program interface (API), a product of International Business Machines Corporation, to determine, for instance, the context classifications, one or more aspects of the monitoring, and/or predictive alerts. Further, embodiments of the present invention that utilize IBM Watson® can utilize APIs that are not part of IBM Watson® to accomplish these aspects. Note that various other APIs and third-party solutions can also provide the above-noted functionality in embodiments of the present invention.

As shown in FIG. 1, the cluster of user objects being monitored can be grouped into different tiers of wireless communication standards. For instance, in one or more implementations, the user's mobile device(s) 110 can possess a tier-0 wireless communication standard(s) capability, which allows the mobile device(s) to communicate using a variety of wireless standards, including, for instance, WiFi, satellite, Bluetooth®, ZigBee™, etc. In one embodiment, the mobile device(s) 110 could be a laptop computer, a mobile phone, a tablet, etc.

In the example of FIG. 1, one or more objects 131 having associated wireless location components 130 are grouped into a tier-1 wireless communication grouping. In this grouping, the user's objects, such as a wallet, luggage, specialty objects, sporting equipment, etc., can include intermediate-range wireless communication standard capabilities, including, for instance, Bluetooth®-based communication capability, ZigBee™-based communication capability, RFID communication capability, and NFC-based communication capability. In a tier-2 wireless communication standard grouping, wireless location components 130 associated with the respective objects 131 can be, for instance, electronic tags which utilize a close-range wireless communication standard, such as NFC-based communication or RFID-based communication. By way of example, the close proximity objects could be credit cards, keys, etc., which are typically in close proximity to a respective tier-1 object. As such, the tier-1 wireless location components could be, in one or more embodiments, electronic devices or sensors capable of receiving location-related data from close proximity objects in the tier-2 grouping, and to provide that information, along with the location data for the associated tier-1 object(s) in the management system back to the user's mobile device(s) 110, either directly or via one or more other wireless location components, that is, in an implementation where a further hierarchy of wireless communication components within the user monitor network is desired.

In one or more implementations, the monitor networks disclosed herein can be configured as a hybrid of a mesh, peer-to-peer, or cluster tree network. The location components can be tiered hierarchically into 2, 3, or more, tiers By way of example, in tier-0, location components can be embedded into high-functioning, highly integrated, and power intensive devices, such as smartphones, laptops, tablets, etc. These location components are capable of multiple different long- and medium-range communication protocols, such 4G, cellular, WiFi Wi-Max, Bluetooth®, ZigBee™, etc. The location components at the tier-0 level can also allow the user to reconfigure the monitor network as desired, and can serve as a gateway to the remote computer resource(s) 120 in the example of FIG. 1, which in one or more embodiments, can be cloud-based computer resources.

Further, in the example of FIG. 1, the tier-1 location components can be location components attached to medium-function objects, such as a bag, luggage, wallet, etc. These location components can be capable of limited medium- and short-range communication protocols, such as Bluetooth®, ZigBee™, NFC, RFID, etc. In one or more embodiments, the tier-1 location components underpin the proximity approach to learning and proactive alerts disclosed herein. Further, the tier-1 location components serve as a pipeline between the tier-2 and tier-0 location components. The tier-2 location components can be, in one or more embodiments, electronic tags associated with or attached to lower-function objects, such as a credit card. A low-function object is typically wirelessly coupled to a medium-function object, and in one or more implementations, should always be close to that object, such as a credit card being close to a wallet.

The above, and further aspects of one or more embodiments of management system processing are described in additional detail below with reference to FIGS. 3A-9C.

Figure 2:
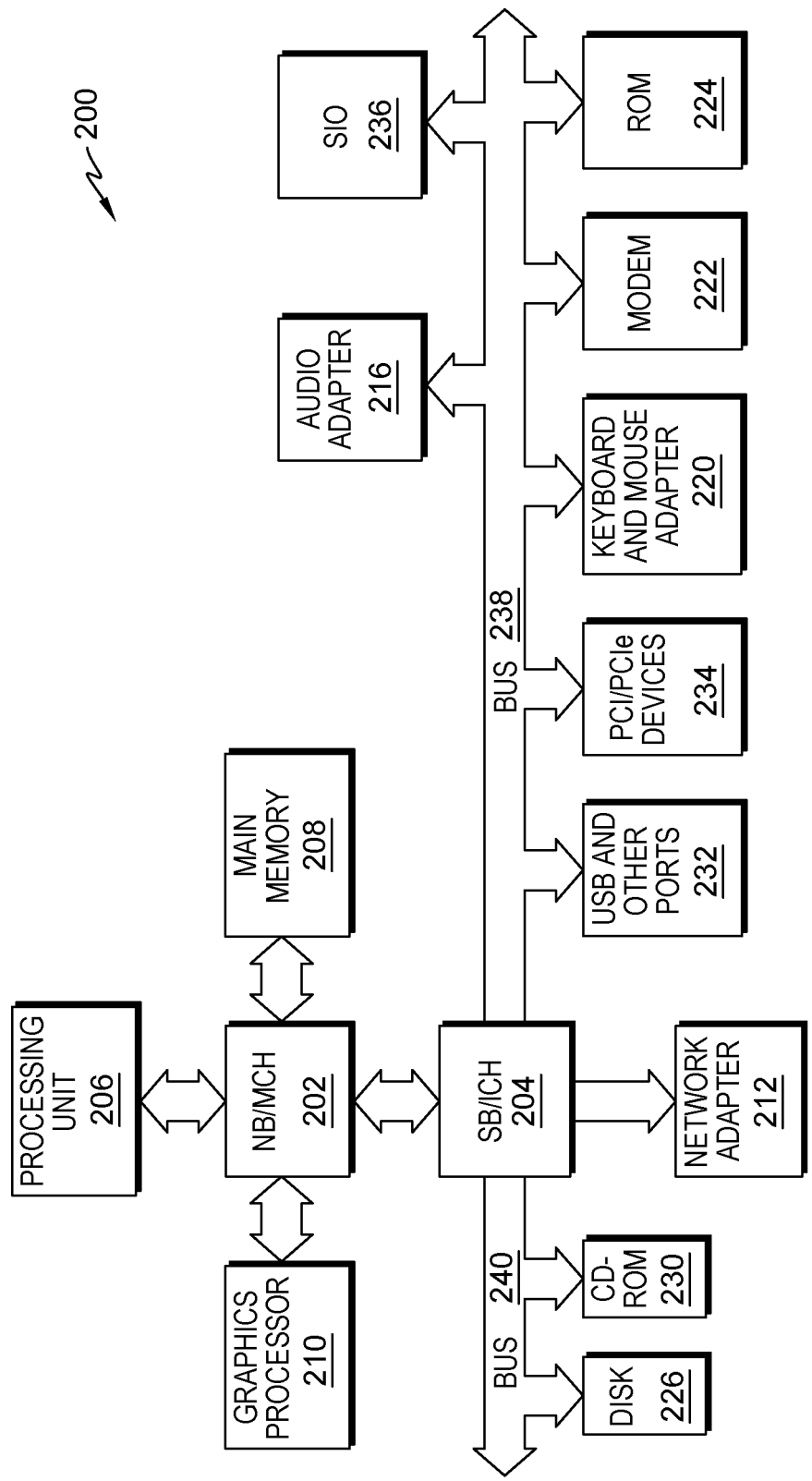
FIG. 2 is a block diagram of data processing system into which various aspects of an embodiment of a set-based object management system processing can be implemented, in accordance with one or more aspects of the present invention.

Before discussing these figures, FIG. 2 depicts a block diagram of data processing system in which illustrative aspects of the present invention can be implemented. Data processing system 200 can be one example of a computer, such as mobile device(s) 110 and/or computer resource(s) 120 in the system of FIG. 1, and can include computer usable program code or instructions implementing processes such as disclosed herein.

In the depicted example, data processing system 200 includes a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 can contain one or more processors and even can be implemented using one or more heterogeneous processor systems. Graphics processor 210 can be coupled to the NB/MCH through an accelerated graphics port (AGP), for example.

In the depicted example, a local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices can include, for example, Ethernet adapters, add-in cards, and PC cards for notebook computers. PCI uses a card bus controller, while PCIe does not. ROM 224 can be, for example, a flash binary input/output system (BIOS). Hard disk drive 226 and CD-ROM 230 can use, for example, an integrated drive electronics (IDE) or serial advanced technology attachment (SATA) interface. A super I/O (SIO) device 236 can be coupled to south bridge and I/O controller hub 204.

An operating system runs on processing unit 206 and coordinates and provides control of various components within data processing system 200 in FIG. 2. The operating system can be a commercially available operating system. An object oriented programming system can run in conjunction with the operating system and provide calls to the operating system from programs or applications executing on data processing system 200.

Instructions for the operating system, the object-oriented programming system, and applications or programs can be located on storage devices, such as hard disk drive 226, and can be loaded into main memory 208 for execution by processing unit 206. The processes of the illustrative aspects discussed herein can be performed by processing unit 206 using computer implemented instructions, which can be located in a memory such as, for example, main memory 208, read only memory 224, or in one or more peripheral devices.

Note that the hardware embodiment depicted in FIG. 2 can vary depending on the desired implementation. Other internal hardware or peripheral devices, such as flash memory, equivalent non-volatile memory, or optical disk drives and the like, can be used in addition to or in place of certain hardware depicted. Also, the processes of the illustrative aspects described herein can be applied to other hardware environments, such as to a multiprocessor data processing system.

In one or more implementations, data processing system 200 can be an electronic device or a server computer resource, and can be generally configured with flash memory to provide non-volatile memory for storing operating system files and/or user-generated data. A bus system can include one or more buses, such as a system bus, an I/O bus and a PCI bus. Of course the bus system can be implemented using any type of communications fabric or architecture that provides for a transfer of data between different components or devices attached to the fabric or architecture. A communications unit can include one or more devices used to transmit and receive data, such as a modem or a network adapter. A memory can be, for example, main memory 208 or a cache such as found in north bridge and memory controller hub 202. A processing unit can include one or more processors or CPUs. Those skilled in the art should note that the depicted system example of FIG. 2, as well as other examples referenced herein, are not meant to imply architectural limitations. For example, as briefly noted, data processing system 200 can be implemented as part of a smartphone, a tablet computer, a laptop computer, a desktop computer, a server, a personal digital assistant (PDA), a wireless computer, etc.

Figure 3A:
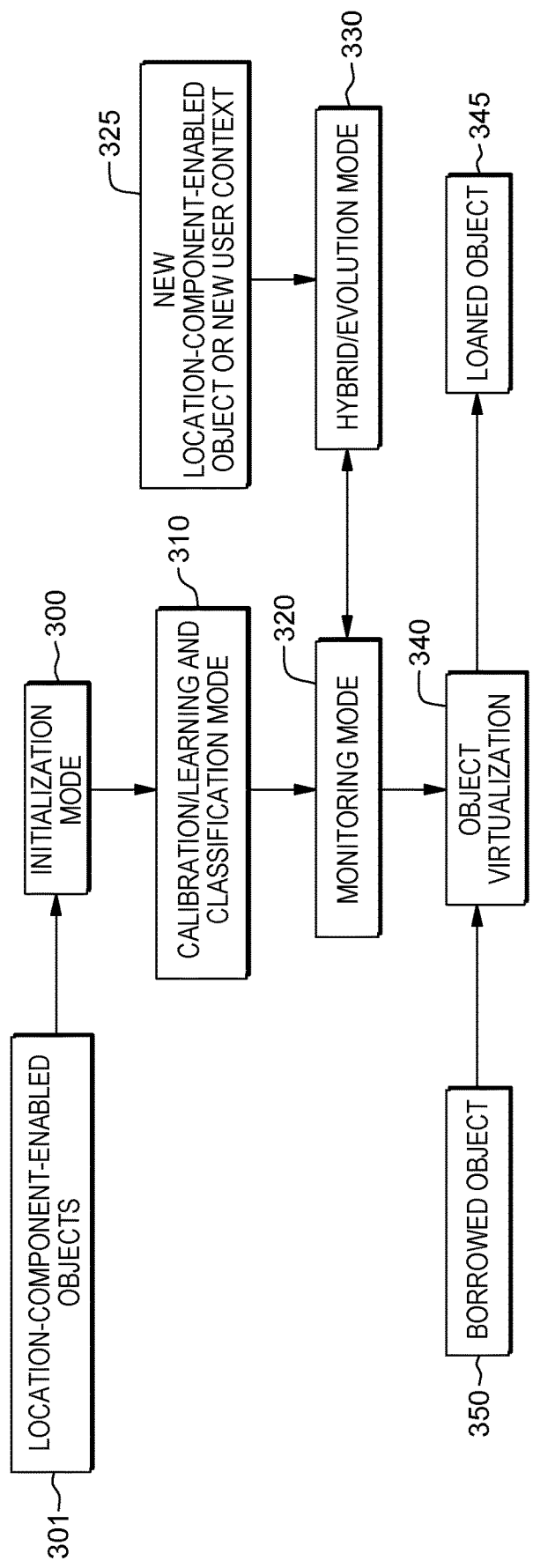
FIG. 3A is an overview illustration of certain aspects of an embodiment of the present invention.

One or more embodiments of a set-based object management system, such as disclosed herein, incorporate multiple operational modes. FIG. 3A depicts one embodiment of operational modes for an object management system, in accordance with one or more aspects of the present invention. As explained below, set-based object management system processing can be segregated into multiple modes or phases, including an initialization mode 300, a calibration (or learning) and classification mode 310, a monitoring mode 320, a hybrid (or evolution) mode 330, and an object virtualization mode 340.

In operation, a new location-component-enabled object 301 is initialized in an initialization mode 300 into a user's private monitor network, which includes a set or cluster of objects to be monitored by the management system. As explained herein, the object being added to the user's monitor network has an associated location component, such as an electronic device, electronic sensor, electronic tag, etc. Initialization mode 300 includes communications between the location component of the object and, for instance, the user's mobile device(s) and/or the computer resource(s) with management system program code.

During calibration and classification mode 310, the object management system learns, for instance, the location and temporal-based behavior of the user with reference to the set of objects being monitored. This learning can include, for instance, obtaining or generating data by the management system representative of location of the user objects in the set relative to each other to obtain a spatial centroid, as well as distance between the individual objects in the set and the obtained spatial centroid. Note in this context that obtaining the spatial centroid of the objects and the individual spatial separation of each object from the spatial centroid refers to the spatial centroid of the location components embedded in, attached to, or associated with those objects, as well as the spatial separation of the respective location components from the determined spatial centroid.

The obtaining of information can include ascertaining over a calibration time period calibration sets of spatial centroids of the objects of the user in different contexts, such as in different locations, different times of day, different activities, different travel means, etc. The calibration sets of obtained data are then sorted by the system (such as the cognitive agent) into multiple context classifications, with each context classification being associated with a respective context of multiple different contexts, such as different locations, sub-set of objects, activities, travel means, etc., that occur during the calibration time interval. For instance, where the user has N objects to be monitored, the management system can monitor via the associated location components of the objects, places (and time of day) that a user frequently visits, the user's travel habits, the user's activities, etc., and with this data, learns the mobility of each object and can classify the obtained calibration data accordingly.

For instance, the objects being monitored can be classified, in one aspect, based on frequency of use. Frequently used objects, such as a smartphone, wallet, watch, etc., can be one classification, while mobile objects such as a laptop, that are more moderately used objects, may be another classification, and infrequently used objects, such as luggage, may be a third classification, etc. In such an implementation, the moderately and infrequently used objects can be left in familiar places, such as the user's home. Depending on the current location, the objects being monitored can be in close contact or proximity. For example, where the user is traveling, all the objects that are being monitored can be carried (or should be carried) meaning that they should be in close range of each other, otherwise an alert can be generated to the user. In one or more implementations, during the calibration (or learning) and classification mode, the management system learns the habits of the user, such as travel times and means of transportation, and learns the objects in the cluster of objects that are typically present for a given type of travel. For instance, from Monday to Thursday, the user takes the train, with both their smartphone and laptop.

During monitoring (or mission) mode 320, an alert is generated if one or more objects in the set of objects of the user's monitor network has been left behind that is usually taken with the other objects. For instance, if it is Monday, and the user is heading to the train station, but the user's laptop is home, an alert can be predictively generated by the management system as described further herein. Further, if a user divides the objects into sub-networks, an alert can be predictively generated. For example, where luggage and a laptop are left in a hotel room, and the user is carrying a smartphone and smartwatch, an alert can be generated that the luggage and laptop have become separated from the other objects. Further, an alert can be predictively generated during the monitoring mode if an object loaned to another user is about to be lost or separated from the other user's monitor network of objects being monitored, as explained further herein.

In hybrid or evolution mode 330, a new location-component-enabled object can be added to the user's monitor network, and/or a new context or location can be identified and added. As explained herein, each object being added has an associated location component, such as an electronic sensor or electronic tag, for wireless communication with one or more other location components and/or the management system. The presence of a new context or location allows the management system to dynamically change or update the multiple context classifications and add respective spatial data for the set of objects for the new context, as explained further herein.

In object virtualization mode 340, a facility is provided for allowing secure sharing of an object from one user's monitor network to another user's monitor network using, for instance, digital twin technology, as explained further herein.

Figure 3B:
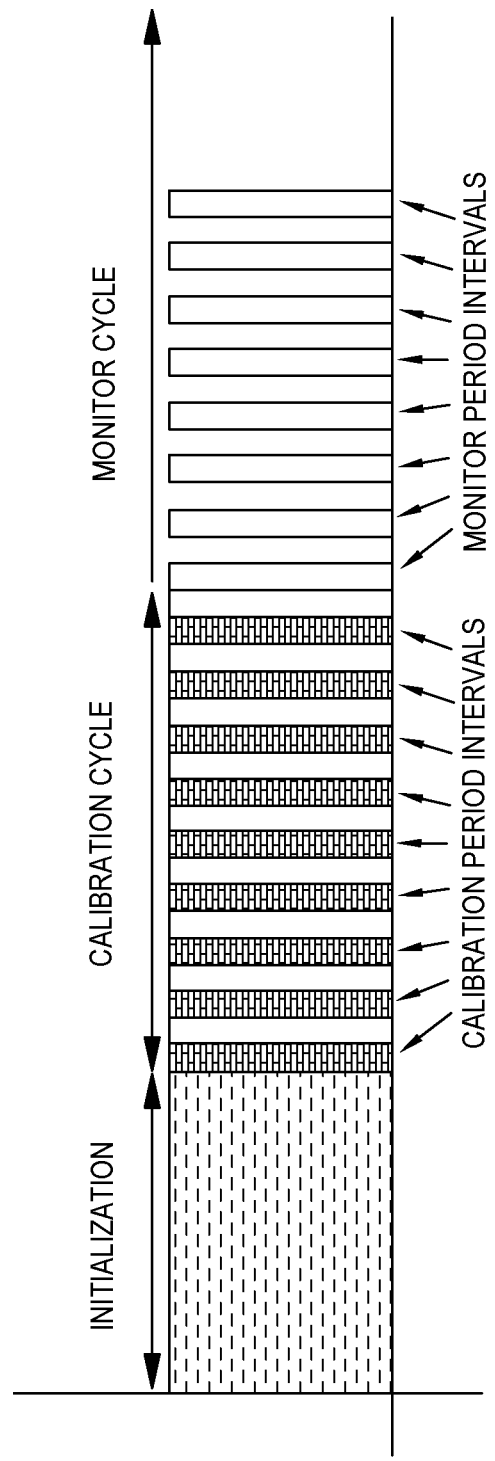
FIG. 3B depicts an exemplary timing diagram depicting certain aspects of an embodiment of the present invention.

By way of example, FIG. 3B depicts an exemplary timing diagram illustrating certain aspects of operational mode timing of a set-based object management system, in accordance with one or more aspects disclosed herein. As depicted in FIG. 3B, operation of the management system includes an initialization mode time interval, a calibration cycle time interval, and a monitor time interval. During the calibration cycle interval, multiple calibration period intervals are identified during which spatial data of the objects in the set of objects being calibrated is obtained. For instance, the management system obtains, based on wireless communication with one or more location components associated with one or more objects of the set, spatial data on the relative location of each object relative to the other, and from this information, ascertains a spatial centroid of the set of objects, and in one or more embodiments, a spatial separation of one or more objects in the set from the spatial centroid. Collecting this information in the calibration period intervals results in the calibration sets of spatial centroids of the objects of the user in different contexts, as well as the associated spatial data for the objects. During the monitor mode, at defined time intervals, e.g., at set monitor period intervals, the relative spatial data is again obtained from the one or more location components in order for the management system to monitor the set of objects, as described herein.

Further details of one embodiment of the above-noted operational modes of FIG. 3A for a set-based object management system embodiment such as disclosed herein are described below with reference to FIGS. 4-8.

Figure 4:
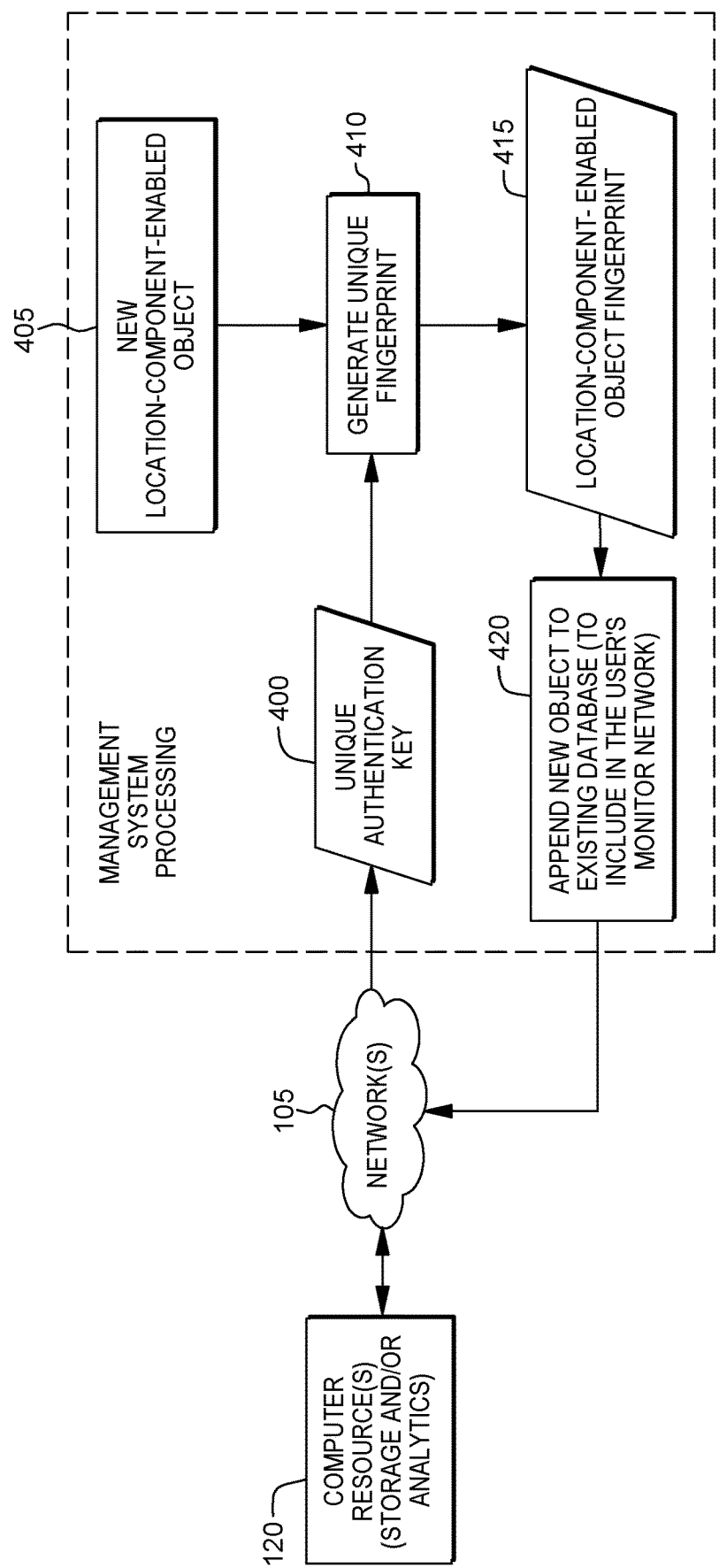
FIG. 4 is an illustration of one embodiment of initialization mode processing of a set-based object management system, in accordance with one or more aspects of the present invention.

In FIG. 4, computer resource(s) 120 includes, for instance, storage and/or analytics processing for an object management system such as disclosed herein, and can be operatively coupled to the management system processing, for instance, running on the user's mobile device via one or more networks 105. Initialization mode processing can begin with a user purchasing an object through a retail point-of-sale, e-commerce, or other channel. The user decides whether an embedded location component solution is required. If so, the user might send the object to a specialized foundry that is able to embed the location component into the object using, for instance, industrial processes. Following this, the foundry provides the location-component-enabled object back to the user. At this point, the location component is unauthenticated. Alternatively, if the user decides not to embed the location component, then the user can affix an after-market location component to the object. The new object and all objects in the set of objects, are added to the user's private monitor network which, in one or more embodiments, houses a private key database, and also facilitates secure communication to, for instance, a public network, allowing for sharing of spatial and temporal information. Using the characteristics of the set of objects in the user's monitor network, a unique authentication key 400 can be generated from the existing database. Each new object can then be appended to the user's private monitor network using the self-generated authentication key, which in one or more embodiments, can be similar to a block chain authentication process. As will be understood by those skilled in the art, an object fingerprint can be generated from the existing database(s) and any user preference(s) 410. The location-component-enabled object fingerprint 415 can then be appended as a new object to the existing storage database using the authentication key 420. In one or more embodiments, further instances of objects being added to the set of objects being monitored, that is, to the user's monitor network, can thus have keys that are impacted by the addition of the object.

Figure 5A:
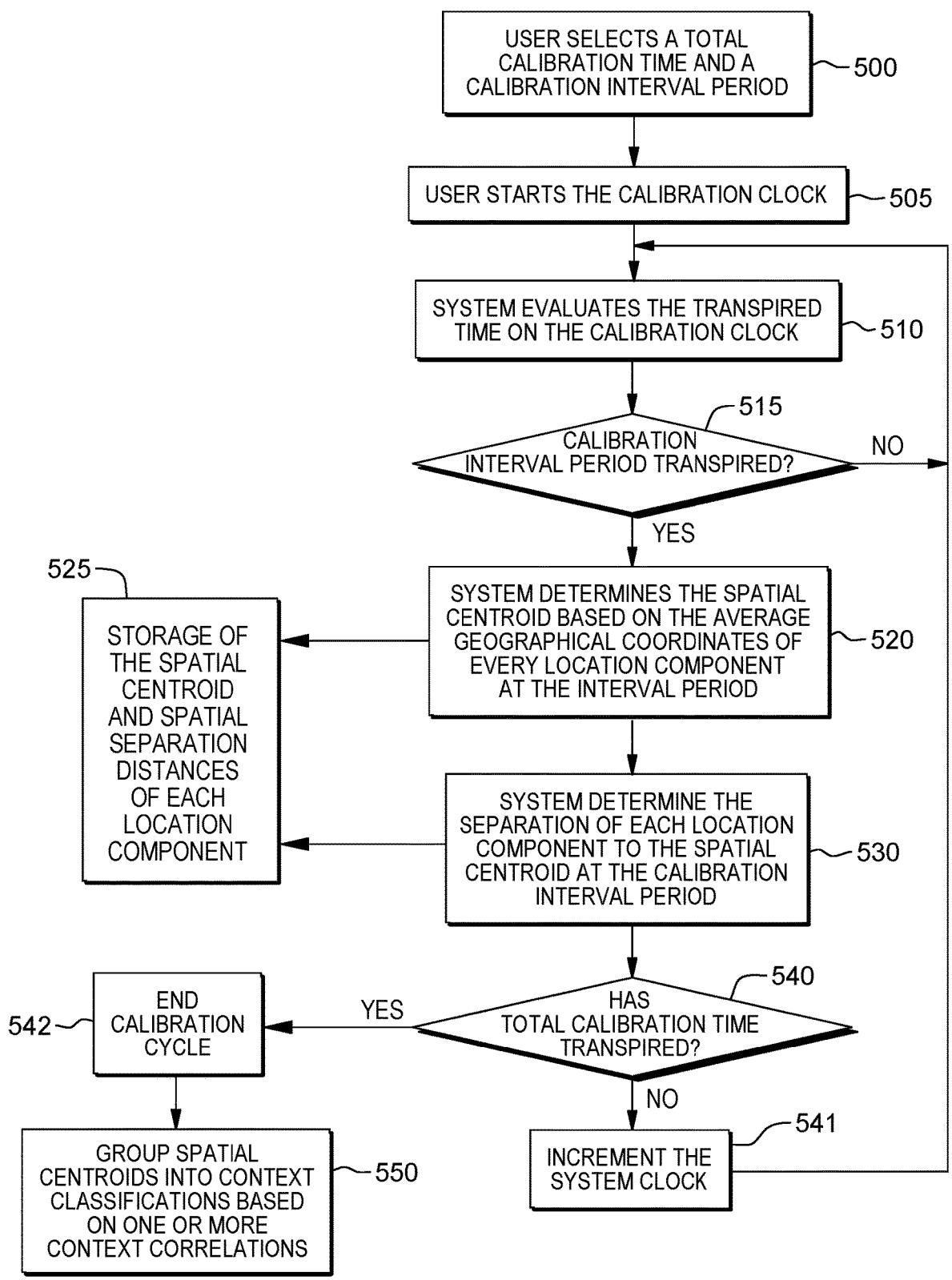
FIG. 5A depicts one embodiment of calibration mode processing of a set-based object management system, in accordance with one or more aspects of the present invention.

FIG. 5A depicts one embodiment of calibration or learning and classification mode processing of a set-based object management system, in accordance with one or more aspects of the present invention. During calibration mode, new objects can be on-boarded to the database used by the system via autonomous self-learning techniques. The process can begin with a user selecting a total calibration time, and a calibration-interval period of the system 500. The calibration cycle interval defines the time or period over which the calibration mode is executed. For instance, the user can elect to calibrate the system over one day, one week, one month, etc. Over this time period, the process allows the system to characterize the behavior of the user by sampling the spatial and temporal signatures of the location components activated for each object in the set of objects. The calibration period interval refers to the periodic time between which "snapshots" of the state of the user's monitor network are captured. A key metric of these snapshots is the spatial location of each location component associated with each object being monitored.

Once the calibration cycle interval and period interval have been set, the calibration clock is initialized to be begin the calibration mode processing 505. In the calibration mode, the management system continually checks the calibration clock 515, and after each period interval, a snapshot of the monitor network is taken, and the spatial centroid of all the location components associated with the objects in the set is determined 520. This spatial centroid is, in one embodiment, the geometric mean of the location component locations. In addition, for each location component, the spatial separation of that component from the spatial centroid is determined 530. This metric represents the geometric distance between the location of that location component, e.g., electronic sensor, electronic tag, etc., and the geometric mean. Note that the determination of the spatial centroid and the spatial separation are facilitated (in one embodiment) via secure access to a public network with Global Positioning Satellite (GPS), or other location-sensing technology. These two metrics, the spatial centroid and the spatial separation, are then logged into a private calibration database of the user's monitor network in the management system. Also logged are the calibration periodic interval, and the date and time from the system clock. As noted, this data is housed in a database as a restricted, private network. Processing then determines whether the total calibration cycle time has elapsed 540. If the calibration cycle time has elapsed, then calibration mode processing is complete 542. If the calibration cycle time has not elapsed, then the system clock is incremented 541, and processing checks the calibration clock and awaits the passing of another calibration period interval.

Note in this regard, that both the calibration period intervals and the monitor period intervals are, in one or more embodiments, dynamic in the sense that they can be in a feedback loop based on how often the monitored spatial centroid and spatial separation changes. The advantage of such an approach is the ability of the system to save power. If the system detects that the least frequently moved item is moving more frequently, then the period interval can be reduced. Conversely, if the system detects that the most frequently moved item is moving less frequently, then the period interval can be dynamically increased.

Along with completing calibration mode processing, the management system further classifies the spatial centroids by grouping the centroids together into a set of context classifications, 550. This can be accomplished using a correlation of the statistics of the spatial centroids and the calibration period intervals. For instance, if over several hundred period intervals, the spatial centroid distribution evolves to one of a very low standard deviation, it may suggest that all the location components are essentially fixed such as when the user is at a location, such as at the user's home or office. By way of example, in FIG. 5B, a spatial centroid 550 is determined for a set of objects 551 at a first location, resulting in a first context classification. In FIG. 5C, the spatial centroid distribution evolves at a different location in a different configuration, where a spatial centroid 550 again is determined for objects 551 in the set of objects being monitored. For instance, the object distribution of FIG. 5B might be typical for the objects being at the user's home, while the configuration of FIG. 5C might be typical for the user's office. Alternatively, if the spatial centroid distribution is a uniform distribution, it may represent a situation where all of the location components are moving with the same velocity, which is the case when the user is in transit, as depicted in FIG. 5D. The statistics of the spatial separation can be brought to bear on the classification task. For instance, at a fixed location, such as the user's home or the office, the spatial separation of each location component is likely to be larger than when the user is in transit, such as in a vehicle. In the latter case, all objects in the set are likely to be on the person or within one vehicle length of the person. Once the classification has been completed by the system, second order metrics can be generated such that the average spatial separation for each location component (or each object) for a given context classification is ascertained by the system. This metric can then be used to automatically trigger in a predictive manner a lost or misplaced object alert, as described herein in connection with the monitor mode of the management system.

Figure 6:
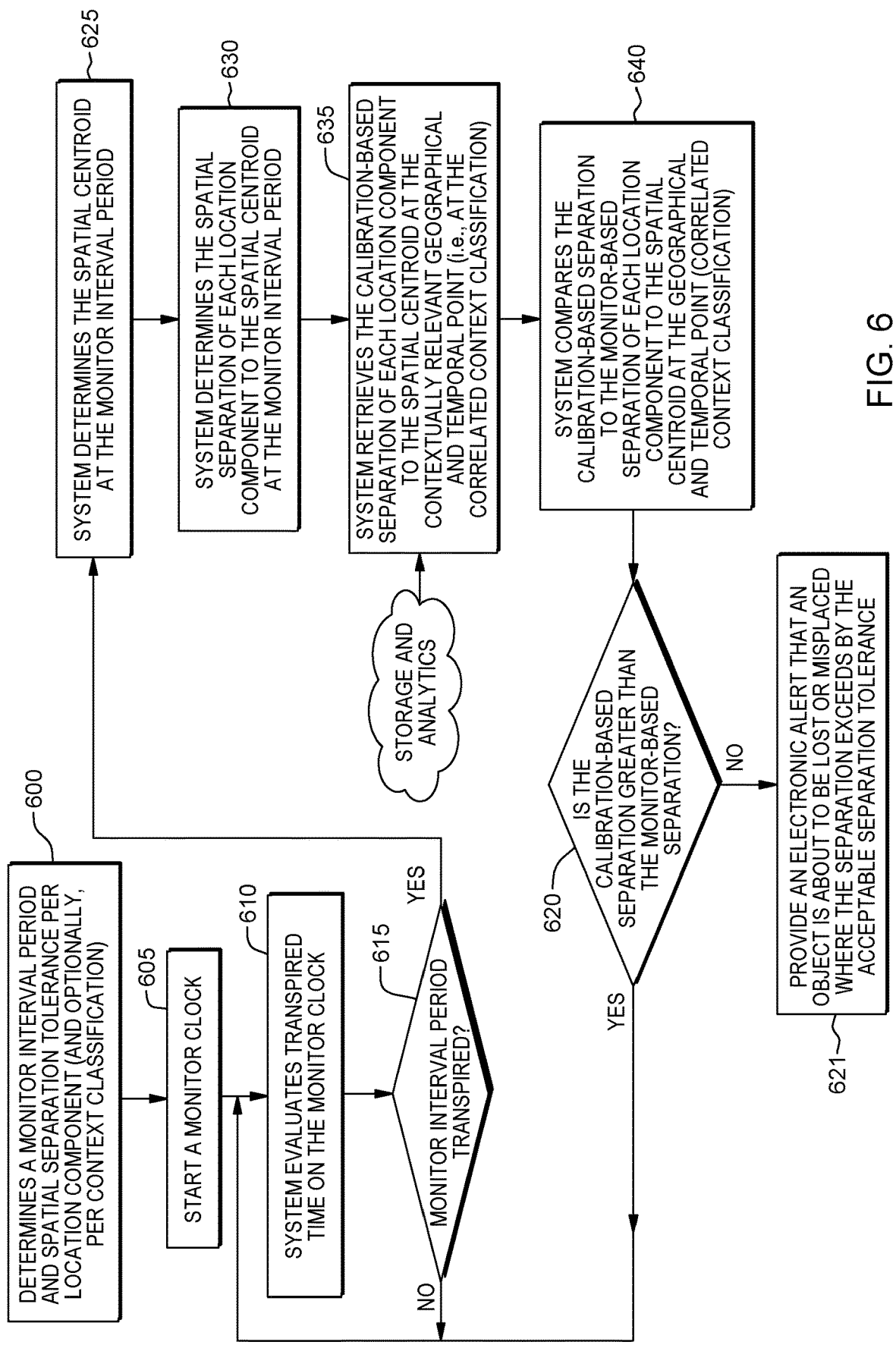
FIG. 6 depicts one embodiment of monitoring mode processing of a set-based object management system, in accordance with one or more aspects of the present invention.

FIG. 6 depicts one embodiment of monitor mode processing of a management system, in accordance with one or more aspects of the present invention. Monitor or tracking mode is a main operational state of the system that naturally follows a successful calibration and classification, which can be defined as a complete set of spatial centroids and spatial separations for the location components at each calibration period interval spanning the entire calibration cycle time. In a manner analogous to calibration mode processing, in monitor mode processing, the monitor period interval is set, for instance, by the user 600. (As noted, both the calibration period intervals and the monitor period intervals can be dynamic in the sense that they are in a feedback loop based on how often the monitored spatial centroid and spatial separation changes. The advantage of this feature is the ability of the system to save power. If the system detects that the least frequently moved item is moving more frequently, then the period interval is reduced. Conversely, if the system detects that the most frequently moved item is moving less frequently, then the period interval can be increased.) There is an additional variable referred to as a spatial separation tolerance, which can also be set by a user for each location component in the user's private monitor network. The spatial separation tolerance is, in one or more embodiments, a measure of the excess spatial separation any location component, and thus, the associated object, is allowed to have over an average spatial separation of the component for a given context classification. In an alternate implementation, the cognitive agent of the management system can predictively determine the acceptable spatial separation tolerance for each location component (or object) in each context classification based, for instance, on the calibration data, as well as prior monitor data. In this way, the cognitive agent can learn over time when the user is about to lose or misplace an object in the user's monitored network, and based thereon, can provide a predictive electronic alert to the user.

Once the monitor period interval and the location component separation tolerances are set, then the monitor clock is activated 605, and processing continually checks the monitor clock for a monitor period interval having elapsed 610. Once a monitor period interval has elapsed 615, then the management system determines a new spatial centroid and spatial separation for, in one embodiment, all of the location components in the user's monitor network, again leveraging a GPS-enabled public network, if needed 625. The management system processing accesses the user's private calibration database and retrieves the average spatial separation during calibration for each location component at the current centroid location 630. If the difference between the current spatial separation and the average spatial separation during calibration exceeds the acceptable spatial separation tolerance, then a lost object alert is automatically triggered 640. If the difference between the current spatial separation and the average spatial separation during calibration does not exceed the acceptable spatial separation tolerance, then system processing proceeds to check the monitor clock, and wait for another monitor period interval to elapse. The result is that monitor mode processing provides for continuous monitoring of the object locations, and automatically triggers alerts should a location component, and the associated object, move out of an acceptable tolerance limit for that object in the correlated context classification.

Figure 7:
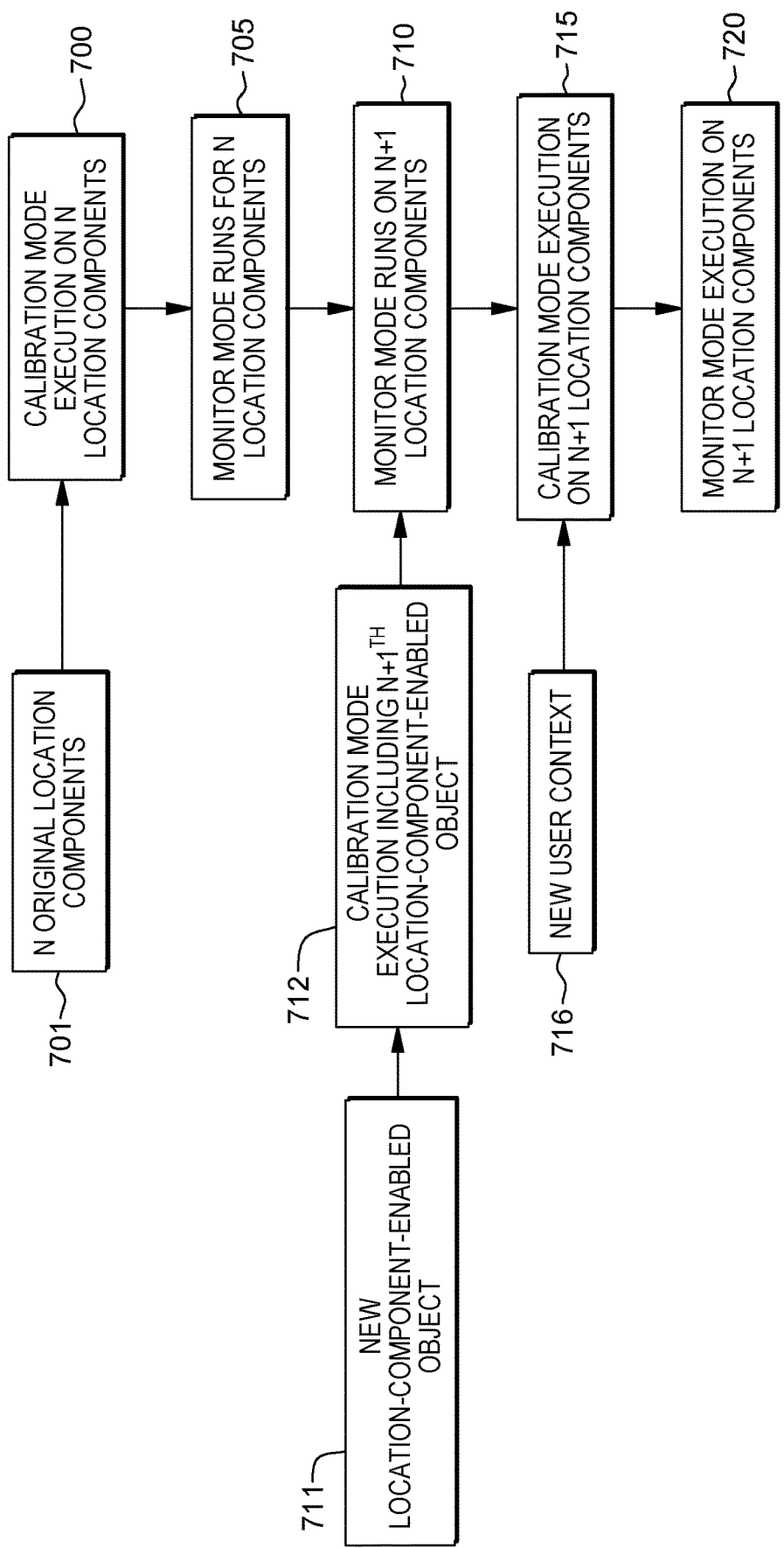
FIG. 7 depicts one embodiment of hybrid or evolution mode processing of a set-based object management system, in accordance with one or more aspects of the present invention.

FIG. 7 depicts one embodiment of hybrid or evolution mode processing of a set-based object management system, in accordance with one or more aspects of the present invention. In evolution mode processing, the system has performed, for N original location components 701, calibration mode execution 700, such as described above in connection with FIG. 5A. Further, the monitor mode has been run or is currently running for the N location components 705, such as described above in connection with FIG. 6. The evolution mode processing allows for the dynamic evolution of the user's monitor network by the management system as new location-component-enabled objects 711 are added to the network to also include monitoring of new objects as part of the set. In such a case, calibration mode execution is performed on the N+1 location component 712 to update the calibration database, and the monitor mode is run on the new set of N+1 location components 710. Note in this regard, that one or more items can be added at a time to the network while in hybrid/evolution mode. Therefore, the new set can have N+1, N+2 etc., with N+1 being one example only.

In another application of the evolution mode, processing can account for a new user context 716. For instance, during the monitoring, a new spatial centroid location of the location components can be identified that is not represented in the user's private database of context classifications. This evolution mode aspect could cover, by way of example only, an instance where the user moves to a new location, changing the user's home location. As with the addition of a new location-component-enabled object, the management system automatically triggers a calibration mode sequence to on-board the new user context by performing calibration mode execution on the N+1 location components 715, after which monitor mode execution continues on the N+1 location component 720. Note that in one or more embodiments, one or more new location components can be added to the user's monitor network, one or more location components can be removed from the network, and/or one or more new user contexts can be identified, each of which can result in triggering of a calibration mode sequence to on-board the change.

Figure 8:
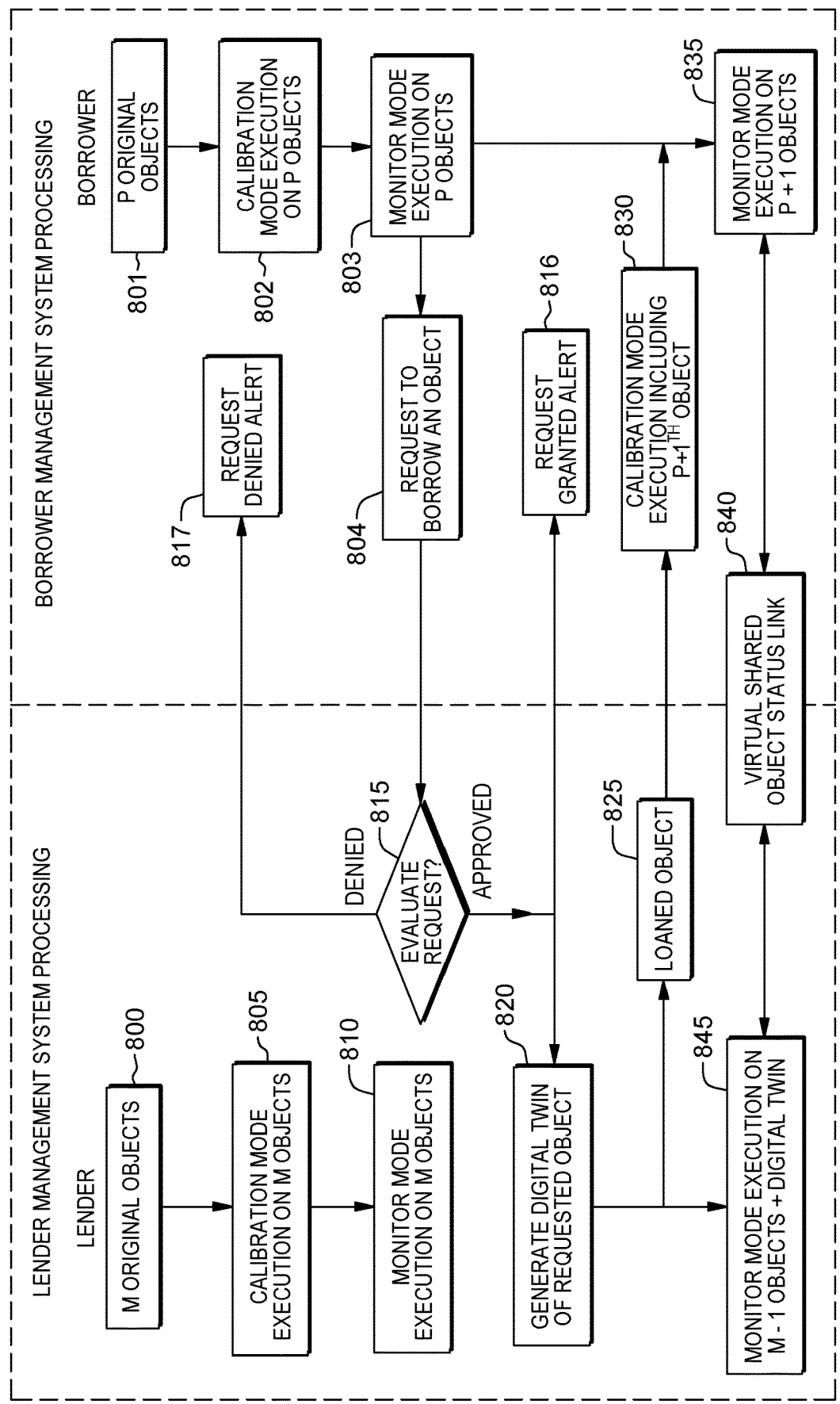
FIG. 8 depicts one embodiment of virtualization mode processing of a set-based object management system, in accordance with one or more aspects of the present invention.

FIG. 8 depicts one embodiment of object virtualization mode processing in a set-based object management system, such as disclosed herein. This mode is to support borrowing or loaning of an object from one user's private monitor network to another user's private monitor network. As illustrated in FIG. 8, the lender management system processing includes for a lender user M original objects 800 that have been processed in calibration mode 805, such as described above, and are being monitored in monitor mode 810, as described herein.

Separately, the borrower management system processing includes for a borrower P original objects 801 that have been processed in a calibration mode 802, and are being monitored in monitor mode 803. Each object has associated therewith a wireless location component, such as an electronic sensor, an electronic tag, etc., as described above. During monitor mode execution on the P objects 803, the borrower's management system receives a request to borrow an object 804 from the lender's user management system. The request is forwarded to the lender management system, which determines whether to accept the request 815. If the request is accepted, a request granted alert or notice is returned 816 to the borrower management system, otherwise, a request denied alert 817 is returned. With approval of the request to borrow an object from the lender's private monitor network, the lender management system can generate a digital twin or virtualization of the requested object 820. This virtualization of the requested object allows the loaned object to be physically transferred to the borrower, after which the borrower's management system can perform a calibration mode execution, including the P+1 object that has been borrowed 830. Monitor mode execution is then performed on the P+1 object(s) 835 by the borrower's management system.

Additionally, for instance, concurrently, the lender management system continues or enters monitor mode execution on the M−1 object(s) (i.e., the location components associated therewith), plus the digital twin 845. A virtual shared object status link 840 is established between the lender management system and the borrower management system to allow the lender management system to receive updates that the loaned object remains within the borrower's private monitor network, that is, has not been misplaced or lost, without providing the lender with a particular geographic location of the loaned object. Note that a feature of the digital twin that is relevant to the present system is the fact that data relevant to the physical object can be seamlessly transmitted to the virtual object (and vice-versa). This allows the virtual object to exist simultaneously with the physical object. In one or more aspects of the present invention, the data is transmitted from the physical object in the borrower's network to the virtual object in the lenders network. In any representation of the spatial distribution of the objects in the lenders network, one or more digital twins are depicted as being virtually located at the spatial centroid of the lender's network, provided that the physical twin of that object is under the control of the borrower's network. In the event that the physical object becomes lost or otherwise compromised in the borrower's network that information is wirelessly transmitted to the digital twin in the lenders network, prompting the lender to enquire of the borrower regarding the status of the object. In the present invention, a feature of the digital twin is that it allows for the protection of the privacy of the borrower since the geographical location of the physical object is not among the data that is transferred from the physical object in the borrower's network to the virtual object in the lender's network. However, the transfer of other relevant data from the physical object to the virtual object is provided allowing the lender to know that the physical object is within the borrower's network. The type of data that can be transferred can depend on the tier level of the device and its associated location component (e.g., electronic tag), and can also include environmental data, such as temperature and humidity, or data indicative of damage sustained to the physical object. Furthermore, the digital twin methodology allows for the orchestration of the second- and third-order object transfers from a first borrower to a second borrower with the explicit approval of the lender, but without the lender being physically involved in the transaction. For example, the lender can be geographically far away from a first borrower and authorize the first borrower to physically transfer the object to a second approved borrower. The virtual object continues to be present in the lender's network and is updated based on the characteristics of the physical object in the second-borrowers network. The digital twin or virtual object is always virtually represented at the spatial centroid of the physical objects under the custody of the lender. If there are multiple physical objects loaned out, then each digital twin or virtual object is simultaneously co-located at the spatial centroid of the remaining physical objects.

Note that an object virtualization mode such as disclosed herein allows two comparatively equipped object management systems to facilitate the sharing of location-component-enabled objects, while providing the lender with security that the loaned item remains under control of the borrower, and also simultaneously respecting the privacy of the borrower concerning the location of the object. This is facilitated through the generation of the digital twin which effectively clones the loaned object in the lender's network, while it is physically located in the borrower's monitor network. Once calibration is complete, the loaned object is part of the borrower's monitor network, which is now running in monitor mode. The virtualization mode, through a virtual shared object status link established between the lender's and borrower's management systems, can provide updates on the status of the loaned object between the lender's and the borrower's management systems, for instance, until the request to borrow the object has been closed.

Further details on one embodiment of set-based object management processing, in accordance with one or more aspects of the present invention, are described below with reference to FIGS. 9A-9C.

Referring to FIG. 9A, in one embodiment, the process includes monitoring, by a management system, a set of objects of a user, where the monitoring includes the management system wirelessly communicating with one or more location components associated with the objects, with each object of the set of objects having a respective location component associated therewith (900). The monitoring includes: ascertaining, by the management system, based at least in part on data obtained via wireless communication with the one or more location components, a spatial centroid of the set of objects and a spatial separation of an object in the set from the spatial centroid (902); correlating, by the management system, the ascertained spatial centroid to a context classification of multiple context classifications (904); and determining, by the management system, whether a difference between the ascertained spatial separation of the object and average spatial separation of the object for the correlated context classification exceeds an acceptable spatial separation tolerance for the correlated context classification (906). Further, the management system processing includes, based on the difference exceeding the acceptable spatial separation tolerance, providing an electronic alert to the user (910).

In one or more embodiments, at least two context classifications of the multiple context classifications have different average spatial separations of the object from respective spatial centroids of the at least two context classifications, and different acceptable spatial separation tolerances (912).

In one or more implementations, the management system processing includes determining, by the management system, the multiple context classifications (914). The determining includes ascertaining over a calibration time period, based at least in part on wireless communications between the management system and the one or more location components associated with the objects, calibration sets of spatial centroids of the objects in different user contexts (916); and sorting the calibration sets of spatial centroids into the multiple context classifications, each context classification being associated with a respective context of the different user contexts (918).

Referring to FIG. 9B, in one or more implementations, the management system processing further includes ascertaining respective average spatial separations of objects in the set relative to a determined spatial centroid of each context classification (920), and ascertaining for the determined context classifications a respective acceptable spatial separation tolerance for the object for each context classification (922).

In one or more implementations, the respective acceptable spatial separation tolerances for the object are different between at least two determined context classifications of the multiple determined context classifications (924). Further, in one or more embodiments, the management system processing allows for the user to modify the set of objects being monitored by the management system, and based on the modifying, to re-determine, by the management system, the multiple context classifications, including ascertaining respective average spatial separations of objects in the modified set relative to a determined spatial centroid of each context classification (926).

In one or more embodiments, management system processing further includes identifying use of the set of objects of the user in a new user context, and based thereon, re-determining, by the management system, the multiple context classifications, where the re-determined multiple context classifications include, in part, a new context classification associated with the new user context (928).

In one or more embodiments, the monitoring by the management system can further include establishing, by the management system, a monitor network with the location components associated with the set of objects, the monitor network being one monitor network of multiple monitor networks, each monitor network including location components associated with, at least in part, a different set of objects (930), and the method can further include instantiating a digital twin location component (and object) within the monitor network based on the user loaning the object of the set of objects to another user with another monitor network of the multiple monitor networks (932). In addition, as illustrated in FIG. 9C, system processing can include establishing, by the management system, a loaned object status link to the another monitor network of the another user to provide the user with a status update on whether the loaned object remains within the another monitor network, absent identifying to the user a geographic location of the loaned object (934). As discussed herein, the link is established from one system to another system. In the case of a system that monitors multiple networks, the objects are all presumed to be physical. For example, if a parent establishes a network for objects owned by a child, and the parent has the ability to monitor the child's network it allows for the parent to be able to see the geographical location of the physical objects in the child's network. Furthermore, if there is a loan of a physical object from the parent to the child this is not a digital twin since the parent has the ability to monitor the child's network. In the digital twinning methodology, the link is made between two independent systems that are unable to monitor each other's network but are simply able to track the relevant data of a physical object in the borrower's network using a virtual object in the lender's network. The geographical location of the physical object is, by construction, not included in the set of relevant data.

In one or more embodiments, at least two objects of the set of objects of the user have different types of location components associated therewith, the different types of location components including an electronic sensor and an electronic tag, the electronic sensor being associated with a first object of the set of objects, and the electronic tag being associated with a second object of the set of objects, with the electronic sensor, in part, wirelessly obtaining location data for the second object from the electronic tag, and the management system obtaining location data for the second object and location data for the first object from the electronic sensor (936).

In one or more embodiments, a mobile device of the user includes, at least in part, the management system, and the electronic sensor wirelessly communicates with the electronic tag using a first wireless communication standard, and the mobile device communicates with the electronic sensor using a second wireless communication standard, the first and second wireless communication standards being different wireless communication standards, and the second wireless communication standard having a greater wireless communication range than the first wireless communication standard (938).

In one or more embodiments, the acceptable spatial separation tolerance for the correlated context classification is predictively determined by a cognitive agent of the management system (940).

Further exemplary embodiments of a computing environment to implement one or more aspects of the present invention are described below with reference to FIGS. 10-12.

By way of further example, FIG. 10 depicts one embodiment of a computing environment 1000, which includes a computing system 1012. Examples of well-known computing systems, environments, and/or configurations that may be suitable for use with computer system 1012 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1012 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 10, computing system 1012, is shown in the form of a general-purpose computing device. The components of computing system 1012 can include, but are not limited to, one or more processors or processing units 1016, a system memory 1023, and a bus 1018 that couples various system components including system memory 1023 to processor 1016.

In one embodiment, processor 1016 may be based on the z/Architecture® offered by International Business Machines Corporation, or other architectures offered by International Business Machines Corporation or other companies.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1012 can include a variety of computer system readable media. Such media may be any available media that is accessible by computing system 1012, and it includes both volatile and non-volatile media, removable and non-removable media.

System memory 1023 can include computer system readable media in the form of volatile memory, such as random access memory (RAM) 1030 and/or cache memory 1032. Computing system 1012 can further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1018 by one or more data media interfaces. As described below, memory 1023 can include at least one program product having a set (e.g., at least one) of program modules or code that are configured to carry out the functions of embodiments of the invention.

Program/utility 1040, having a set (at least one) of program modules 1042, can be stored in memory 1032 by way of example, and not limitation, as well as an operating system, one or more application programs, other program modules, and program data. Each of the operating system, one or more application programs, other program modules, and program data or some combination thereof, can include an implementation of a networking environment. Program modules 1042 generally carry out the functions and/or methodologies of embodiments of the invention as described herein. Alternatively, a set-based object management system facility, module, logic, etc., 1001 can be provided within computing environment 1012 implementing one or more aspects of management system processing, such as disclosed herein.

Computing system 1012 can also communicate with one or more external devices 1014 such as a keyboard, a pointing device, a display 1024, etc.; one or more devices that enable a user to interact with computing system 1012; and/or any devices (e.g., network card, modem, etc.) that enable computing system 1012 to communicate with one or more other computing devices. Such communication can occur via Input/Output (I/O) interfaces 1022. Still yet, computing system 1012 can communicate with one or more networks such as a local area network (LAN), a general wide area network (WAN), and/or a public network (e.g., the Internet) via network adapter 1020. As depicted, network adapter 1020 communicates with the other components of computing system, 1012, via bus 1018. It should be understood that although not shown, other hardware and/or software components could be used in conjunction with computing system 1012. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 10. Computer system/server 1012 of FIG. 10 can be practiced in distributed cloud computing environments where tasks are performed by remote processing devices that are linked through a communications network. In a distributed cloud computing environment, program modules may be located in both local and remote computer system storage media including memory storage devices. Computer system server 1012 is capable of being implemented and/or performing any of the functionality set forth hereinabove.

Figure 11:
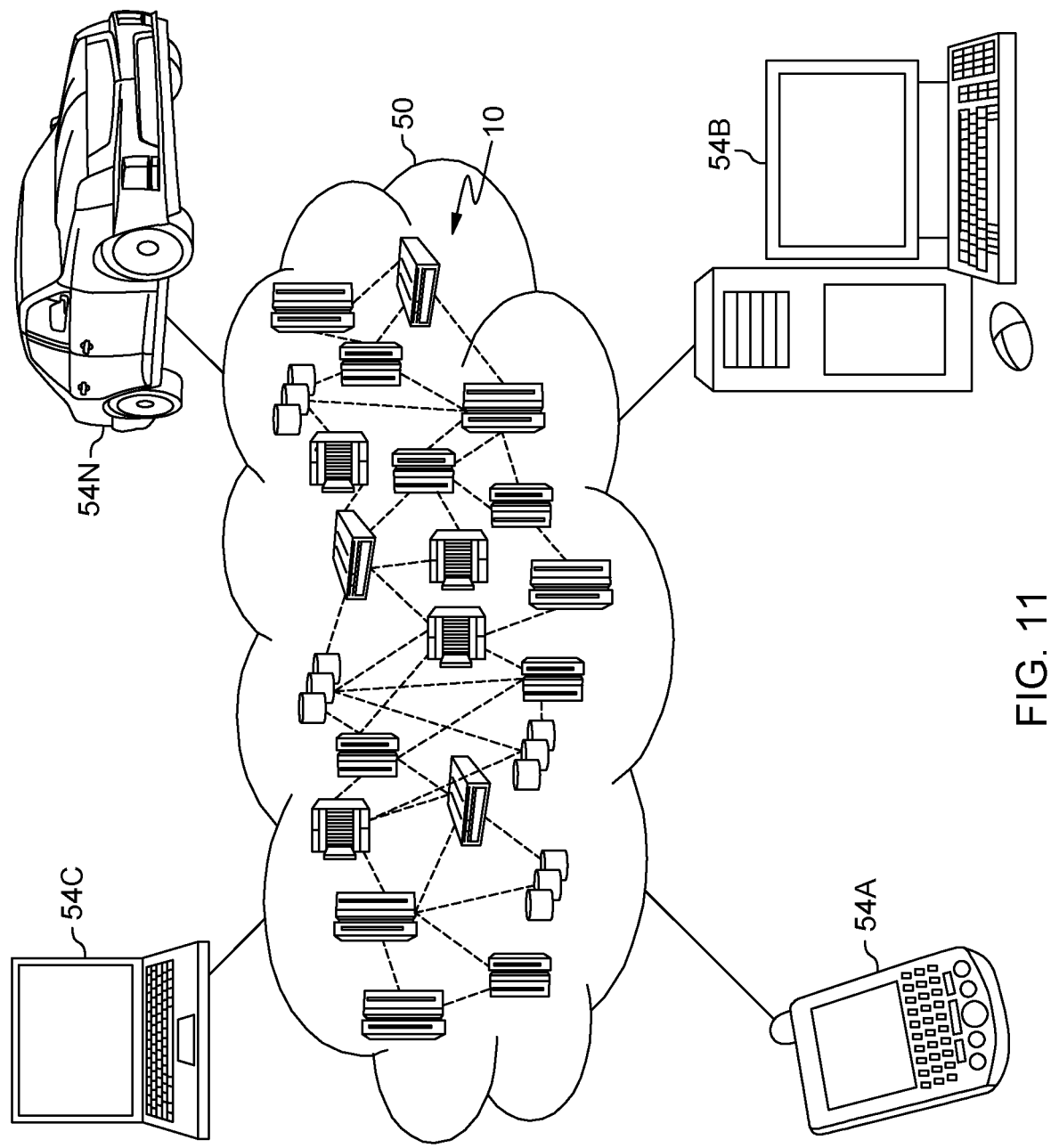
FIG. 11 depicts one embodiment of a cloud computing environment which can facilitate implementing, or be used in association with, one or more aspects of the present invention.

Referring now to FIG. 11, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 12:
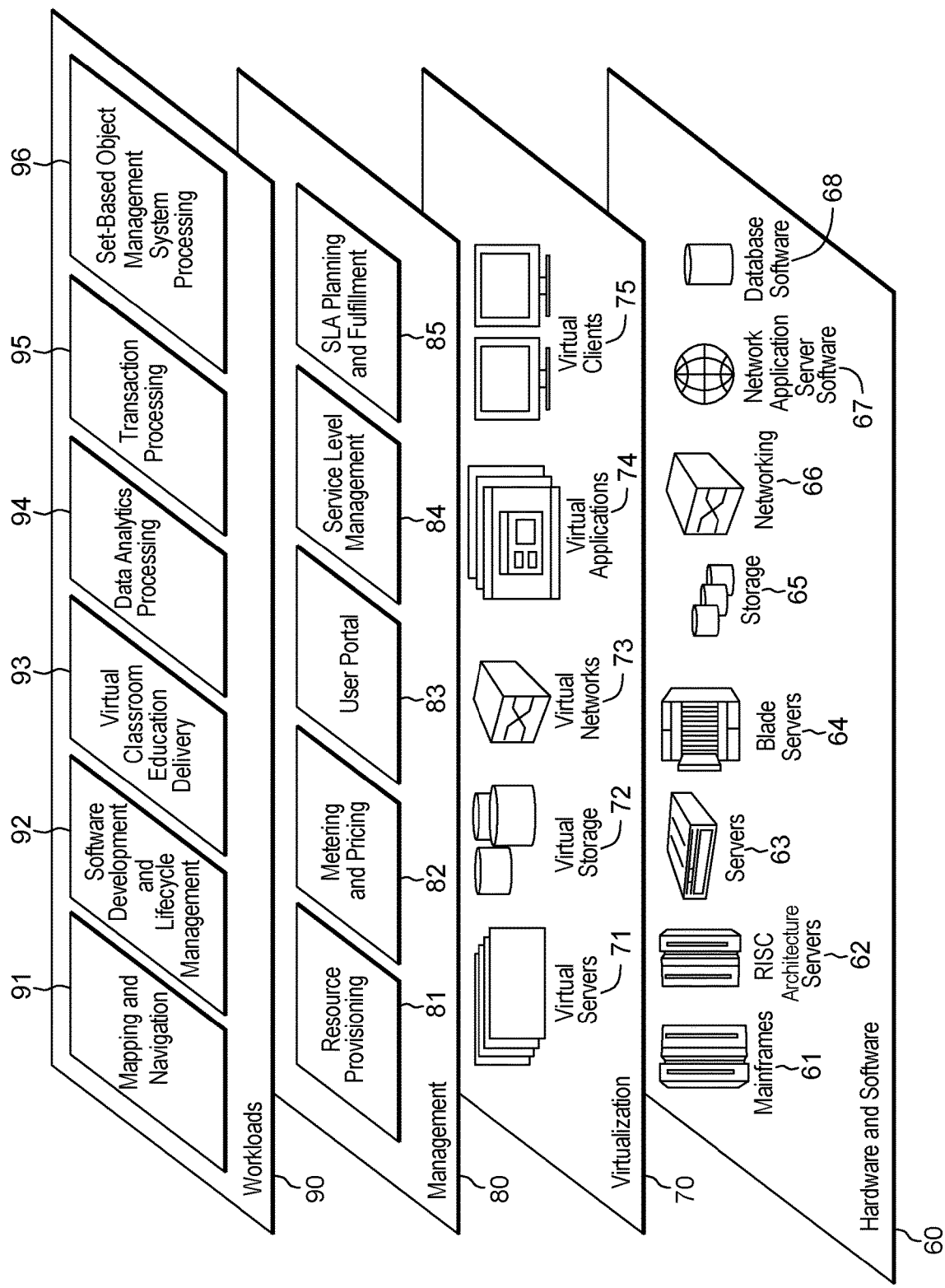
FIG. 12 depicts an example of abstraction model layers according to an embodiment of the present invention.

Referring to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and set-based object management system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of managing user objects, the method comprising:
    monitoring, by a management system, a set of objects of a user, the monitoring including the management system wirelessly communicating with one or more location components associated with the objects, each object of the set of objects having a respective location component associated therewith, the monitoring being for a monitoring interval and comprising:

ascertaining, by the management system, based at least in part on data obtained via wireless communication with the one or more location components, a spatial centroid of the set of objects and a spatial separation of an object in the set from the spatial centroid;

correlating, by the management system, the ascertained spatial centroid to a context classification of multiple pre-determined context classifications; and determining, by the management system, whether a difference between the ascertained spatial separation of the object and a saved average spatial separation of the object for the correlated context classification exceeds an acceptable spatial separation tolerance for the object for the correlated context classification, wherein different objects of the set of objects have different respective, saved average spatial separations from the spatial centroid for the particular correlated context classification; and based on the difference exceeding the acceptable spatial separation tolerance, providing, by the management system, an electronic alert to the user.

2. The method of claim 1, wherein at least two context classifications of the multiple context classifications have different average spatial separations of the object from respective spatial centroids of the at least two context classifications, and different acceptable spatial separation tolerances.

3. The method of claim 1, further comprising:
determining, by the management system, the multiple context classifications, the determining comprising:
ascertaining over a calibration time period, based at least in part on wireless communications between the management system and the one or more location components associated with the objects, calibration sets of spatial centroids of the objects in different user contexts; and
sorting the calibration sets of spatial centroids into the multiple context classifications, each context classification being associated with a respective context of the different user contexts.

4. The method of claim 3, wherein the determining further comprises:
ascertaining respective average spatial separations of objects in the set relative to a determined spatial centroid of each context classification; and
ascertaining for the determined context classifications a respective acceptable spatial separation tolerance for the object for each context classification.

5. The method of claim 4, wherein the respective acceptable spatial separation tolerance for the object is different between at least two determined context classifications of the multiple determined context classifications.

6. The method of claim 4, further comprising modifying by the user the set of objects being monitored by the management system, and based on the modifying, re-determining, by the management system, the multiple context classifications, including ascertaining respective average spatial separations of objects in the modified set relative to a determined spatial centroid of each context classification.

7. The method of claim 4, further comprising identifying use of the set of objects of the user in a new user context, and based thereon, the method further includes re-determining, by the management system, the multiple context classifications, wherein the re-determined multiple context classifications include, in part, a new context classification associated with the new user context.

8. The method of claim 1, wherein the monitoring comprises establishing, by the management system, a monitor network including the location components associated with the set of objects, the monitor network being one monitor network of multiple monitor networks, each monitor network comprising location components associated with, at least in part, a different set of objects, and the method further comprises:
instantiating a digital twin within the monitor network based on the user loaning an object of the set of objects to another user with another monitor network of the multiple monitor networks.

9. The method of claim 8, further comprising establishing, by the management system, a loaned object status link to the another monitor network of the another user to provide the user with a status update on whether the loaned object remains within the another monitor network, absent identifying to the user a geographic location of the loaned object.

10. The method of claim 1, wherein at least two objects of the set of objects of the user have different types of location components associated therewith, the different types of location components comprising an electronic sensor and an electronic tag, the electronic sensor being associated with a first object of the set of objects, and the electronic tag being associated with a second object of the set of objects, wherein the electronic sensor, in part, wirelessly obtains location data for the second object from the electronic tag, and the management system obtains the location data for the second object and location data for the first object from the electronic sensor.

11. The method of claim 10, wherein a mobile device of the user comprises, at least in part, the management system, and wherein the electronic sensor wirelessly communicates with the electronic tag using a first wireless communication standard, and the mobile device communicates with the electronic sensor using a second wireless communication standard, the first and second wireless communication standards being different wireless communication standards, and the second wireless communication standard having a greater wireless communication range than the first wireless communication standard.

12. The method of claim 1, wherein the acceptable spatial separation tolerance for the object for the correlated context classification is predictively determined by a cognitive agent of the management system.

13. A computer system comprising:
a memory; and
one or more processors in communication with the memory, wherein the computer system is configured to perform a method comprising:
monitoring, by a management system, a set of objects of a user, the monitoring including the management system wirelessly communicating with one or more location components associated with the objects, each object of the set of objects having a respective location component associated therewith, the monitoring being for a monitoring interval and comprising:
ascertaining, by the management system, based at least in part on data obtained via wireless communication with the one or more location components, a spatial centroid of the set of objects and a spatial separation of an object in the set from the spatial centroid;

correlating, by the management system, the ascertained spatial centroid to a context classification of multiple pre-determined context classifications; and determining, by the management system, whether a difference between the ascertained spatial separation of the object and a saved average spatial separation of the object for the correlated context classification exceeds an acceptable spatial separation tolerance for the object for the correlated context classification, wherein different objects of the set of objects have different respective, saved average spatial separations from the spatial centroid for the particular correlated context classification; and based on the difference exceeding the acceptable spatial separation tolerance, providing, by the management system, an electronic alert to the user.

14. The computer system of claim 13, further comprising:
determining, by the management system, the multiple context classifications, the determining comprising:
ascertaining over a calibration time period, based at least in part on wireless communications between the management system and the one or more location components associated with the objects, calibration sets of spatial centroids of the objects in different user contexts; and
sorting the calibration sets of spatial centroids into the multiple context classifications, each context classification being associated with a respective context of the different user contexts.

15. The computer system of claim 14, wherein the determining further comprises:
ascertaining respective average spatial separations of objects in the set relative to a determined spatial centroid of each context classification; and
ascertaining for the determined context classifications a respective acceptable spatial separation tolerance for the object for each context classification.

16. The computer system of claim 15, further comprising modifying by the user the set of objects being monitored by the management system, and based on the modifying, re-determining, by the management system, the multiple context classifications, including ascertaining respective average spatial separations of objects in the modified set relative to a determined spatial centroid of each context classification.

17. The computer system of claim 15, further comprising identifying use of the set of objects of the user in a new user context, and based thereon, the method further includes re-determining, by the management system, the multiple context classifications, wherein the re-determined multiple context classifications include, in part, a new context classification associated with the new user context.

18. The computer system of claim 13, wherein the monitoring comprises establishing, by the management system, a monitor network including the location components associated with the set of objects, the monitor network being one monitor network of multiple monitor networks, each monitor network comprising location components associated with, at least in part, a different set of objects, and the method further comprises:
instantiating a digital twin within the monitor network based on the user loaning an object of the set of objects to another user with another monitor network of the multiple monitor networks.

19. The computer system of claim 18, further comprising establishing, by the management system, a loaned object status link to the another monitor network of the another user to provide the user with a status update on whether the loaned object remains within the another monitor network, absent identifying to the user a geographic location of the loaned object.

20. A computer program product comprising:
a computer-readable storage medium readable by a processing circuit and storing instructions for execution by the processing circuit for performing a method comprising:
monitoring, by a management system, a set of objects of a user, the monitoring including the management system wirelessly communicating with one or more location components associated with the objects, each object of the set of objects having a respective location component associated therewith, the monitoring being for a monitoring interval and comprising:
ascertaining, by the management system, based at least in part on data obtained via wireless communication with the one or more location components, a spatial centroid of the set of objects and a spatial separation of an object in the set from the spatial centroid;
correlating, by the management system, the ascertained spatial centroid to a context classification of multiple pre-determined context classifications; and
determining, by the management system, whether a difference between the ascertained spatial separation of the object and a saved average spatial separation of the object for the correlated context classification exceeds an acceptable spatial separation tolerance for the object for the correlated context classification, wherein different objects of the set of objects have different respective, saved average spatial separations from the spatial centroid for the particular correlated context classification; and
based on the difference exceeding the acceptable spatial separation tolerance, providing, by the management system, an electronic alert to the user.

* * * * *